United States Patent
Hyman

(10) Patent No.: US 11,341,863 B2
(45) Date of Patent: *May 24, 2022

(54) COMPOSITIONS AND IMAGE MAKING MEDIA

(71) Applicant: Sydney Hyman, New York, NY (US)

(72) Inventor: Sydney Hyman, New York, NY (US)

(*) Notice: Subject to any disclaimer, the term of this patent is extended or adjusted under 35 U.S.C. 154(b) by 517 days.

This patent is subject to a terminal disclaimer.

(21) Appl. No.: 15/630,499

(22) Filed: Jun. 22, 2017

(65) Prior Publication Data

US 2017/0287351 A1 Oct. 5, 2017

Related U.S. Application Data

(63) Continuation of application No. 14/584,921, filed on Dec. 29, 2014, now Pat. No. 9,786,194, which is a continuation-in-part of application No. 14/203,327, filed on Mar. 10, 2014, now Pat. No. 9,744,800, which is a continuation-in-part of application No. 10/170,503, filed on Jun. 14, 2002, now Pat. No. 7,629,400, which is a continuation of application No. 10/012,259, filed on Dec. 11, 2001, now abandoned, which is a continuation-in-part of application No. PCT/US00/16111, filed on Jun. 12, 2000, said application No. 14/203,327 is a continuation-in-part of application No. 11/118,975, filed on Apr. 28, 2005, now Pat. No. 8,921,473, application No. 15/630,499, which is a continuation of application No. 14/203,327, filed on Mar. 10, 2014, now Pat. No. 9,744,800.

(60) Provisional application No. 60/138,694, filed on Jun. 11, 1999, provisional application No. 60/567,022, filed on Apr. 30, 2004.

(51) Int. Cl.
| | |
|---|---|
| G09B 11/10 | (2006.01) |
| B44C 3/04 | (2006.01) |
| B44C 5/00 | (2006.01) |
| B44D 3/18 | (2006.01) |
| B44F 1/00 | (2006.01) |
| C08K 5/00 | (2006.01) |

(52) U.S. Cl.
CPC ............ *G09B 11/10* (2013.01); *B44C 3/046* (2013.01); *B44C 3/048* (2013.01); *B44C 5/00* (2013.01); *B44D 3/18* (2013.01); *B44F 1/00* (2013.01); *C08K 5/005* (2013.01)

(58) Field of Classification Search
CPC .. B44F 1/00; B44D 3/18; B44C 3/046; B44C 3/048; B44C 5/00

See application file for complete search history.

(56) References Cited

U.S. PATENT DOCUMENTS

| | | | |
|---|---|---|---|
| 3,424,714 A | 1/1969 | Anspon et al. | |
| 3,700,754 A | 10/1972 | Schmitt et al. | |
| 3,775,560 A | 11/1973 | Ebeling et al. | |
| 3,911,215 A | 10/1975 | Hurst et al. | |
| 3,911,560 A | 10/1975 | Amelio et al. | |
| 4,320,174 A | 3/1982 | Rabinovitch et al. | |
| 4,551,493 A | 11/1985 | Blinne et al. | |
| 4,578,294 A | 3/1986 | Ouchi et al. | |
| 4,935,275 A | 6/1990 | Ushida et al. | |
| 5,102,597 A | 4/1992 | Roe et al. | |
| 5,241,006 A | 8/1993 | Iqbal et al. | |
| 5,461,114 A | 10/1995 | Kita | |
| 5,512,620 A | 4/1996 | van Hout et al. | |
| 5,513,991 A * | 5/1996 | Reynolds ............... | G09B 7/04 348/61 |
| 5,523,167 A | 6/1996 | Hunt et al. | |
| 5,532,053 A | 7/1996 | Mueller | |
| 5,599,412 A | 2/1997 | Faris | |
| 5,674,579 A | 10/1997 | Ladouce et al. | |
| 5,700,894 A | 12/1997 | Krieg et al. | |
| 5,725,990 A | 3/1998 | Hirai et al. | |
| 5,859,141 A | 1/1999 | Tsubaki et al. | |
| 6,071,998 A | 6/2000 | Muller | |
| 6,214,422 B1 | 4/2001 | Yializis | |
| 6,248,457 B1 | 6/2001 | Chen et al. | |
| 6,338,807 B1 | 1/2002 | Faris | |
| 6,377,238 B1 | 4/2002 | McPheters | |
| 6,392,785 B1 | 5/2002 | Albert et al. | |
| 6,413,656 B1 | 7/2002 | Thompson et al. | |
| 6,413,790 B1 | 7/2002 | Duthaler et al. | |
| 6,422,687 B1 | 7/2002 | Jacobson | |
| 6,445,489 B1 | 9/2002 | Jacobson et al. | |
| 6,498,114 B1 | 12/2002 | Amundson et al. | |
| 6,518,949 B2 | 2/2003 | Drzaic | |
| 6,949,237 B2 | 9/2005 | Smalley et al. | |
| 7,629,400 B2 * | 12/2009 | Hyman ................... | B41M 1/30 524/106 |
| 8,669,325 B1 * | 3/2014 | Hyman ................... | B44C 3/048 524/609 |

(Continued)

FOREIGN PATENT DOCUMENTS

| | | |
|---|---|---|
| DE | 19522118 C1 | 3/1997 |
| EP | 0120296 A1 | 10/1984 |

(Continued)

*Primary Examiner* — Edward J Cain

(57) ABSTRACT

The invention relates to compositions for forming an aesthetic work of art, design or architecture made as, from, with and/or on an image support medium. Compositions of the image support mediums generally include one or more light-emitting devices, one or more non-light-emissive devices capable of change, a form that is partially or entirely transparent or translucent, or a combination of these. Examples are made using organic light-emitting diodes (OLEDs), thin light-emitting devices, electronic paper technology and polymer compositions with an aspect of their permanence enhanced. Among other variations of the invention are works prepared with a composition or a means of display or installation that optimizes or enhances them aesthetically. The invention also relates to a method for preparing the composition and the image support medium.

45 Claims, No Drawings

(56) References Cited

U.S. PATENT DOCUMENTS

| | | | | |
|---|---|---|---|---|
| 8,921,473 B1* | 12/2014 | Hyman | ................... | C08K 3/04 |
| | | | | 524/445 |
| 9,744,800 B2* | 8/2017 | Hyman | ................... | B44D 3/18 |
| 9,786,194 B2* | 10/2017 | Hyman | ................... | B44C 5/00 |
| 2003/0008135 A1 | 1/2003 | Kawamura et al. | | |
| 2003/0035917 A1 | 2/2003 | Hyman | | |
| 2004/0217332 A1 | 11/2004 | Waegner et al. | | |
| 2005/0079386 A1 | 4/2005 | Brown, Jr. et al. | | |
| 2006/0255952 A1 | 11/2006 | Waegner | | |
| 2010/0245221 A1* | 9/2010 | Khan | ................. | G02F 1/13476 |
| | | | | 345/87 |
| 2012/0242609 A1* | 9/2012 | Izadi | ................... | G06F 16/4393 |
| | | | | 345/173 |
| 2013/0146905 A1* | 6/2013 | Ray | ....................... | B82Y 20/00 |
| | | | | 257/88 |

FOREIGN PATENT DOCUMENTS

| | | |
|---|---|---|
| EP | 0827981 A2 | 3/1998 |
| EP | 0921160 A1 | 6/1999 |
| GB | 974111 A | 11/1964 |
| WO | WO 9116143 A1 | 10/1991 |
| WO | WO 0077085 A1 | 12/2000 |

* cited by examiner

COMPOSITIONS AND IMAGE MAKING MEDIA

CROSS-REFERENCE TO RELATED APPLICATIONS

This application is a continuation of (1) application Ser. No. 14/203,327, filed Dec. 29, 2014, now U.S. Pat. No. 9,744,800, which is a continuation of application Ser. No. 10/170,503 filed Jun. 14, 2002, now U.S. Pat. No. 7,629,400, which is a continuation of application Ser. No. 10/012,259, filed Dec. 11, 2001, now abandoned, which is a continuation-in-part of PCT Application No. PCT/US00/16111, filed Jun. 12, 2000, which claims the benefit of Provisional Application No. 60/138,694, filed Jun. 11, 1999; and (2) application Ser. No. 11/118,975 filed Apr. 28, 2005, now U.S. Pat. No. 8,921,473 which claims the benefit of Provisional Application 60/567,022 filed Apr. 30, 2004. The content of each prior application is expressly incorporated herein by reference thereto.

FIELD OF INVENTION

The present invention relates to a medium for making art, design and architecture, a process for making the medium, and methods for using the medium to make art, design and architecture. Image-making support mediums of the present invention and art, design and architecture of the present invention are macroscopic works that are two or three dimensional, with at least one display that is light-emissive or non-light emissive, with a form that is partially or entirely transparent or translucent, or with a combination of these.

BACKGROUND OF THE INVENTION

New mediums and new processes, and modifications of conventional mediums and processes often expand the use of formal elements thereby making the creation of new works of art, design and architecture possible, and enabling ideas to be realized in aesthetic works that previously could not be achieved. Consequently, for thousands of years those making art, design, and architecture and those working with them have focused an enormous amount of work on developing new image making mediums and processes, particularly mediums and processes that expand aesthetic and functional possibilities. Science and cutting edge science has historically played a major role in this endeavor. Today designers, artists, architects and other image makers are deeply involved in exploring all kinds of areas of science in order to develop art, design and architecture; in order to use the formal elements in new ways; in order to realize their ideas e.g., without compromising; and in order to expand and innovate art, design and architecture. The present invention is part of this mainstream current of image making tied to science.

The present invention combines art, design and architecture with science as never before. Prior to this invention, the use of polymers in images was limited and problematic, (e.g., refer to U.S. Pat. No. 7,629,400). By taking advantage of a wide range of polymers, and a wide range of other, unconventional and novel materials, processes, and advances on the frontiers of science, the present invention expands the formal elements available for making art, design and architecture considerably. This invention offers very desirable new mediums and processes for making images as well as novel variations of conventional image making mediums and processes, both of which have many variations. Examples are new transparent and translucent image support mediums, new illuminated aesthetic works and new color-changing aesthetic works made using polymeric compositions; e-materials like electronic paper; paper thin light-emitting displays, as well as nanomaterials and nanotechnology which can enhance and impart remarkable properties or formal elements to inventive images of art, design and architecture. These can expand the use of light, color, space, transparency, form, structure, strength, visual effects, interactivity, and/or permanence of inventive aesthetic works to such an extent that a wide range of new aesthetic works can be created, some of which will be strikingly different from art, design and architecture made prior to this invention. By opening the horizon for image making, this invention will expand the variety of new images that will exist. Refer to further description in U.S. Pat. Nos. 7,629,400; 8,921,473 and 8,669,325, and in allowed U.S. patent application Ser. No. 14/203,327 and Ser. No. 14/584,921.

SUMMARY OF THE INVENTION

The invention relates to compositions for making images, art, design and architecture, and methods for making these compositions. These compositions are preferably in the form of a synthetic fine-artist's image-making support medium that is a new reinvented version of the conventional utilitarian fine artist's canvas, canvas panel, canvas pad, art board, drawing pad or image support, wherein this new reinvented image support medium facilitates the creation of art, design or architecture therewith, thereupon or therefrom, sometimes referred to herein as an image. The invention also relates to a method for preparing the image-making support medium, and to the art, design and architecture created. Image-making support mediums of the present invention and works of art, design and architecture of the present invention are made with at least one display that is light-emissive or non-light-emissive, they are made with a transparent or translucent polymer, or they are made with a form that is partially or entirely transparent or translucent.

In examples of different embodiments, aesthetic works of the present invention might be two or three dimensional forms in any macroscopic size or shape, with notable light properties, with color that changes or that can be changed, with enhanced permanence/stability, or with a combination of these. An aesthetic work of the present invention might for example, emit a glow of light, and/or transmit light through a stabile clear form, through negative space in the work, or through a lens or other part that creates a light effect. These elements might be used artistically in the work. Moreover, aesthetic works of the present invention might have a compositional arrangement and/or a means of display that enhances their light properties and/or other aesthetic effects, and this compositional arrangement or means of display may be changeable, variable or rearrangeable.

In embodiments, such works might be made with a light emitter that is one or a combination of: an organic light emitting diode (OLED); a light-emitting display screen that is partially or entirely transparent or translucent; a light-emitting display screen capable of flexing or folding; or a light-emitting display screen that is approximately about 6 mm thick or thinner.

In different embodiments such works might be made with electronic paper or an e-material. Or such works might be made with a visible tangible transparent or translucent form or display capable of aesthetic change that is independent of any separate light source that may be part of the work. In different embodiments, works of the present invention may have one or more nanomaterials.

In embodiments works of the present invention might be made with an organic transistor, a transparent transistor, an organic light-emitting transistor (OLET) or a transistor that is a combination of these. They might be made with a conductive polymer, an absorbent polymer and/or one or more nanomaterials. Or works of the present invention might be made with a combination of any of these, or with any of these and another variation such as a visible aesthetic element.

Works of the present invention can be made with innumerable variations, many of which are aesthetic or both aesthetic and visual, though others are functional.

DETAILED DESCRIPTION OF THE INVENTION

The present invention provides a medium for a work in progress or an image of art or design that can be formed, reworked, and controlled as desired. In variations, the inventive medium is a polymeric composition, is prepared by polymerizing one or more monomers to form at least one polymer in an amount sufficient to provide or enable the image to have at least one aesthetic element. Preferably, the inventive medium comprises a polymeric material with one or more of these properties: (a) transparency and/or translucency, (b) other desired optical properties, (c) strength, stability, and/or permanence, (d) it is conductive, (e) it enables the further processing desired, (f) it provides or enables the image to have another aesthetic or structural element, or (g) a combination of these.

This application expressly incorporates herein by reference thereto the entire disclosure of U.S. Pat. Nos. 7,629,400 and 8,921,473. In particular, all of the drawing figures (Figs.) described herein are inventive images based on the drawings of U.S. Pat. No. 7,629,400. This application also expressly incorporates herein by reference thereto the entire disclosures of U.S. Pat. No. 8,669,325 and U.S. patent application Ser. No. 14/203,327 filed Mar. 10, 2014 and Ser. No. 14/584,921 filed Apr. 28, 2005. Despite that those documents form part of the present application, the drawings are omitted here for convenience, because they are available from public sources such as the PTO website (www.USPTO.gov) in published and downloadable documents. Any definitions used herein that are not explicitly defined can be found in U.S. Pat. Nos. 7,629,400, 8,669,325 and 8,921,473 and are incorporated herein by reference.

The term "stabilizer" as used herein, refers to any object, compound, component, or action that imparts chemical, mechanical, or dimensional stability to an item, either directly or indirectly, through initiation of one or a series of events or intermediate steps, in the formation of an image. Stabilizers include processing aids, as well as materials that reduce or eliminate changes to a polymer image after it has been formed. Moreover, an inventive image may have more than one stabilizer, which may be similar or different. Often a single stabilizer affects more than one property in cPRM or in the polymer. Typically, the stabilizer includes less than about 40% by volume of the total volume an image.

One class of stabilizers that are particularly useful in the present invention are color stabilizers, such as those that reduce or eliminate discoloration of polymers. Examples are ultra violet light stabilizers, ultra violet light absorbers, and hindered amine light stabilizers (HALS).

Other useful stabilizers are ingredients added to cPRM i) to cause surfaces of the cPRM exposed to air during the polymerization reaction to form smooth surfaces; or ii) to promote the complete curing of the cPRM. When added to cPRM, wax or mixtures containing wax (such as SILMAR®'s A-111, mixtures of monomers and wax, encaustic paints, other conventional painting media with wax ingredients, and mixtures of wax and a solvent) are examples of stabilizers that can fulfill both of these functions. Compositions superimposed upon incompletely cured polymer surfaces that further cure or fully cure them are stabilizers. Methyl ethyl ketone peroxide (MEKP) can function as such a stabilizer.

Still further useful stabilizers include layers and parts that strengthen, reinforce, support, or enhance the support of an inventive image, such as layers and parts that enhance an image's strength, its stability, its form, or its structure, e.g., so that the image can be set up, installed or displayed for viewing. These layers or parts are on or in the polymer in an inventive image. Though some of these stabilizers are non-polymeric, it is preferable that many stabilizers in this class be polymeric. Also, it is often desirable that inventive images with these strengthening stabilizers have one or more additional, different stabilizers, such as a stabilizer that preserves the color stability of the polymer or a processing aid stabilizer, depending on the specifications of individual inventive images. Examples of these strengthening stabilizers follow.

(a) Fiber, such as fiberglass like surfacing veil fiberglass, and fabric fibers. It is preferred that transparent or translucent conventional fabric (such as shims) that, to the unaided human eye does not have an open weave, that is superimposed by transparent or translucent cPRM that becomes discolored (e.g., yellow or amber discoloration of a polymer caused by exposure to ultra violet light that appears within 3 years of the polymer's formation) is not used.

(b) The new unique means of installation and display described herein are in this class of stabilizers, such as the new rigid mount system, the new wire mount system, and the new combination rigid and wire mount system described herein;

(c) Other members of this class of stabilizers are types of 2D and 3D image supports used on or in a polymer in inventive images. It is often preferable that these stabilizers be polymeric. Among the many variations of these stabilizers are some of the examples which follow on this list;

(d) rigid layers or parts on or in the polymer that strengthen the polymer;

(e) layers including a strong polymer such as a cross linked polymer on or in a polymer in an inventive image that is less strong, the use of which makes the image stronger, more stable, function more effectively, or more permanent;

(f) layers or parts on or in the polymer, that are or that function as backings, frames, stretchers, crossbars, reinforcing ribs or struts, lead lines (e.g., as in glass works), mats, and frameworks used to reinforce and strengthen conventional images;

(g) a layer or part (such as a substrate, an internal layer, or an external layer) that provides or enhances the support of a polymer part or layer which in its use in an inventive image, is weak or not strong, fragile, flexible, delicate, brittle, gelatinous or somewhat gelatinous, or at risk to change over time in form, structure or surface, such as a substrate supporting a conductive polymer or an absorbent polymer in an inventive image, or a rigid part that enhances the structure of flexible polymer in an inventive image;

(h) more than one of these examples (a)-(g) used on or in a single inventive image;

(i) a strengthening stabilizer with a form that is a combination of two or more of the forms described in examples (a)-(g) used in and/or on an inventive image.

Other types of stabilizers that are useful in the present invention include moisture scavengers; antioxidants (such as 2,6-di-tert-butyl-4-methylphenol as well as CYANOX® antioxidants by Cytec Industries Inc.; WESTON® and ULTRANOX® antioxidants by General Electric Company; and IRGANOX® LC Blends by Ciba Geigy); materials that remove hubbies from and/or defoam cPRM (such as BYK®-A 555 by Byk Chemie); anti-ozonants (such as Santoflex 1350PD by Flexsys America LP); leveling agents (such as wax or mixtures containing wax, as well as leveling agents marketed by Byk Chemie); optical brighteners and other compositions that absorb ultraviolet light and fluoresce in the visible blue spectrum (such as UVITEX® OB by Ciba Geigy); cPRM viscosity modifiers and associative thickeners (such as AEROSIL® by Degussa Corp.); and polymerization regulators for example, inhibitors (such as free radical inhibitors).

Other stabilizers protect polymer inventive images or parts thereof against changes in physical properties, or enhance physical or mechanical properties, dimensional stability, or heat resistance of polymer inventive images. Examples are stabilizers that enhance the physical or mechanical properties or the dimensional stability of absorbent polymers, such as ingredients used in absorbent polymers and in cPRM forming absorbent polymers that make them less gelatinous, stronger, or more solid. Other examples are stabilizers for use in inventive images that protect polymers or parts thereof (such as their surfaces) against delamination, peeling, chalking (e.g., pigment washes or rubs off), other reduced adhesion of the primer or top coat, cracking, checking, the loss of coating integrity, loss of surface gloss, loss of surface distinctness, loss of visual depth, or other surface degradation (such as HALS by Ciba-Geigy). There are stabilizers that affect mar resistance, surface slip, or surface flow (such as products by Byk Chemie and by Tego Chemie). There are impact modifier stabilizers (such as METABLEN® products by Elf Atochem); stabilizers that are plasticizers or that maintain or enhance polymer flexibility (such as dibutyl phthalate); and stabilizers that maintain or enhance the hardness of polymers or parts thereof. There are stabilizers that inhibit or protect against organic corrosion in polymers or deactivate metal (such as IRGACOR® by Ciba Geigy). There are thermal and heat stabilizers both for processing polymers and for protecting formed polymers (such as THERMO-LITE® by Elf Atochem North America Inc., in Philadelphia, Pa.). There are stabilizers used in cPRM to control shrinkage as it cures (such as milled fibers). An ingredient added to polymerization reaction mixture or to a polymer to modify the polymer's absorbency is also a stabilizer.

The formation of some polymers typically requires certain stabilizers. For example, specific stabilizers are typically required for the formation of conductive polymers such as those conductive polymers that emit light. Both the process of doping or treating a polymer so that it becomes conductive or more conductive, and the dopant or agent used in such processes are stabilizers. For example, a polymer might be doped so that electrons are removed such as through oxidation (e.g., with chlorine, bromine, or iodine vapor) or so that electrons are introduced such as through reductive doping (e.g., with an alkali metal). Energy conducted by a conductive polymer is a stabilizer in any form, as is the form or device that can supply or carry that energy. Used with a conductive polymer in an inventive image, electrical current, solar power or another form of energy, a battery, and wires that carry energy to a conductive polymer are stabilizers. Moreover, spin casting processes and printing processes (such as ink jet printing) used to apply conductive polymers to image supports, other inventive image surfaces, or parts thereof, are also stabilizers. Stabilizers aid in processing polymers using conventional practices, e.g., affecting melt flow, lubricating, overcoming notch sensitivity (such as BLENDEX® Modifier Resins by General Electric Company and IRGANOX □ HP products by Ciba Geigy).

In some embodiments, PRM is radiation cured, for instance, by the use of ultraviolet light or nearby blue light, or by electron beam (EB), Radiation that initiates or aids polymerization is a stabilizer. Thus, for example, visible light is a stabilizer with the photoinitiator camphoriquinone.

One or more ingredients that enable the formation or fortification of the bond between the polymer inventive image and at least one superimposed application or colorant are stabilizers. When mixed into cPRM typically in amounts of about 0.4% to 40% by volume of the total volume of the cPRM, conventional paints, sizes, primers, binders used in conventional image making media and materials, conventional media for painting, absorbent polymers, cPRM or PRM that forms absorbent polymers, and wax and compositions containing wax, can be stabilizers if they enable the formation or fortification of the bond between the polymer and one or more superimpositions made upon it. Examples of such stabilizers are conventional oil and acrylic paints and painting media.

The use of opposing charges can also enable the formation or fortification of a bond. Thus, the use of a negatively or a positively charged monomer stabilizer in a neutral cPRM can enable the formation or fortification of a bond between the polymer formed and an oppositely charged superimposed application, such as a paint, an ink, or another colorant. Such negatively or positively charged monomer stabilizers are preferably used in a neutral cPRM at about 0.4% to 40% (by volume), preferably at about 0.5% to 10%, and more preferably at about 0.5% to 6%. Adhesion promoters such as products made to promote the adhesion of a polymer to a substrate, may also be used as stabilizers in inventive images, such as adhesion resins by Creanova Inc.

Other stabilizers are ingredients added to applications made on polymer inventive images, typically in amounts from about 0.4% to 40%, by volume, but more preferably in amounts from about 0.4% to 25%, by volume of the application's total volume, (i) to cause or enhance the bond between that application and the polymer inventive image; or (ii) to further cure or fully cure the polymer inventive image onto which it is applied. Examples of such stabilizers are cPRM, solvents appropriate for the linear polymer surfaces they are superimposed upon, MEKP, photoinitiators, and other catalysts. Such stabilizers might be mixed into applications, for instance into a conventional image making material or medium (such as a conventional paint, a painting medium or paper pulp); into an unconventional image making material or medium; or into a glue or adhesive.

Surface preparation stabilizers are preferred stabilizers. A single inventive image may have one or more surface preparation stabilizers. The formula, y—about 40=about 0.786x, is a preferred linear relationship between "x", the approximate percentage of polymer in the inventive image's surface preparation stabilizers (by volume), and "y", the approximate maximum percentage of surface preparation stabilizer in the inventive image's total volume. Thus, for example, if there is no polymer in the surface preparation stabilizer in an inventive image, this stabilizer includes less than about 40% of the inventive image's total volume. If an inventive image's surface preparation stabilizer is made of about 35% or more polymer, it includes less than about 67.5% of the inventive image's total volume. If an inventive image's surface preparation stabilizer is made of about 70% or more polymer, it includes less than about 95% of the inventive image's total volume.

One kind of surface preparation stabilizer is a composition on the surface of an inventive image or part thereof that (i) causes or enhances bonding to one or more superimpositions; or (ii) functions as an underlayer for further processing by additive or subtractive processes (e.g., as a primer, as underpainting, as underdrawing, as a ground, or as an imprimatura). In completed inventive images, surface preparation stabilizers are at least in part superimposed by one or more compositions that are different from the surfaces they superimpose or different from the polymer beneath the surfaces they superimpose. In addition, or alternately, in completed inventive images, surface preparation stabilizers are at least partially carved, incised, or both. Such surface preparation stabilizers are typically made using polymers that may be carved or incised effectively, e.g., they used on image surfaces that cannot be carved or incised as effectively. Surface preparation stabilizers might contribute to inventive images aesthetically or structurally prior to further processing them.

Surface preparation stabilizers and the surfaces or image supports they are used upon may or may not be made or entirely made of polymers of the present invention. Surface preparation stabilizers may be continuous or discontinuous on part or all of one or more inventive image surfaces. For example, a surface preparation stabilizer on a polymer inventive image might be an imprimatura made of a composition that is not a conventional paint, serving as an intermediary enabling a superimposed conventional paint to bond to that polymer that might not have bonded or bonded as strongly to that polymer had it been applied directly onto its surface. The same surface preparation stabilizer or a different one might enable an inventive image to have a carved or incised drawing, pattern, or texture. Depending on their use in an inventive image, one or more conventional image making materials, media, or both may serve as a surface preparation stabilizer, such as conventional paints, binders, primers, etc. A mixed polymer may be a surface preparation stabilizer. Bonding spots and Separating Layers can be surface preparation stabilizers. Separating Layers may have surface preparation stabilizers on them.

Another kind of surface preparation stabilizer is SSI on a polymer inventive image surface. Whether they are continuous or discontinuous on a polymer surface, SSI are a surface preparation stabilizer, provided they are partially or entirely, yet directly superimposed by: (i) a conventional image making medium (such as paint, ink, pencil, pastel, chalk, pen, crayon, a photographic emulsion, printing, another marker); (ii) a colorant with an unconventional vehicle (such as a paint made with cPRM as its binder); (iii) a conventional or an unconventional underlayer (such as underdrawing, underpainting, a primer, an imprimatura or a ground); or (iv) a combination of these. Thus, for example, SSI superimposed by media or materials for the sole purpose of bonding are not stabilizers, and SSI superimposed by protective coatings, fixatives, or sealers are not stabilizers.

Image support stabilizers are both a class of stabilizers and a type of image support. Image support stabilizers are either made to bond to at least one superimposition (such as a paint or ink). Or image support stabilizers are comprised of a polymer composition which by its formulation or design, works well with one or more subtractive processes (such as cutting, calving, or incising). For example, polymers made for subtractive processes involving the use of tools that would be ineffective on linear polymer surfaces would typically be made of crosslinked polymer formulations (e.g., tools that heat up as they are used so that their bits or blades get clogged by the linear polymer). Image supports made of greater than about 85% (by volume) polymethyl methacrylate or methyl methacrylate, which are exact, even geometric shapes or forms (like conventional preformed acrylic sheets, rods, cubes, or spheres) and which are preferably transparent or translucent, are typically not image support stabilizers, unless for example, they have surface preparation stabilizers on them made of a different composition (preferably polymeric) in which case they might be image support stabilizers. Also, conventional polymer image supports in the form of sheets and films that are preferably transparent or translucent, are typically not image support stabilizers, (e.g., acetate, MYLAR® and vinyl have all been made into images by cutting), unless for example, they have surface preparation stabilizers on them made of a different composition (preferably polymeric) in which case they might be image support stabilizers.

One kind of image support stabilizer includes at least one polymer that is a transparent polymer or a synthetic translucent polymer. Typically, the volume of these image support stabilizers has a percentage of transparent or synthetic translucent polymer that is at least about 51%, preferably at least about 55%, more preferably, at least about 65%, still more preferably at least about 75%, and most preferably at least about 85%, in different embodiments. Another kind of image support stabilizer includes at least one polymer that is a synthetic absorbent polymer or a conductive polymer. Yet another kind of image support stabilizer includes a surface preparation stabilizer superimposed on at least a substantial portion of at least one surface of an image support.

Separating layer stabilizers are another kind of image support stabilizer. These are substantially planar polymer layers that are at least partially transparent or translucent. The two, planar, opposite sides of a separating layer stabilizer are made to separate superimposed applications, other colorants, carving, incising, or other marking. Thus, for example, separating layer stabilizers enable applications, other colorants, carving, incising, or other marking to be added to inventive images in unlimited layers, without having to be created directly on one another. Separating layer stabilizers may contain non polymeric ingredients, or other stabilizers. The compositions of applications or other colorants separated by a separating layer stabilizer must be different from that of the stabilizer, though they may be the same as one another. It is preferable that applications separated by a separating layer stabilizer be bonded to it. Conventional polymer image supports are typically not separating layer stabilizers without an additional stabilizer or additional polymer of the present invention (e.g., sheets and films of polyester, MYLAR®, acetate, and acrylic). As an example, in forming an inventive image, one or more separating layer stabilizers are used to separate layers of paint and incising. This separating layer stabilizer might, for example, be electrically active or comprised of a conductive polymer such as a polymer LED.

Image support stabilizers that are not separating layer stabilizers are typically the principal element in their inventive image's shape or form, and they typically remain so in the completed image. Of the completed inventive image's total volume, image support stabilizers typically comprise about 51% to 100%, preferably about 55% to 100%, more preferably about 65% to 100%, still more preferably about 70% to 100%, and most preferably about 75% to 100%, in different embodiments. Image support stabilizers which are not separating layer stabilizers are often part of their image's structure also. Among examples are image support stabilizers made using rigid polymers, and image support stabilizers made using flexible polymer, that may for example, be bonded to one or more other polymeric or non-polymeric elements that provide structural support. An image support stabilizer may therefore be an inventive image's principal structural element, its entire structure, or almost its entire structure. In another example, flexible image support stabilizers can rely on another image part or on their method of installation or display for structural support to any degree, (e.g., a flexible image support might be draped over another image part or over a pedestal).

Image support stabilizers made to bond to at least one superimposition are typically, at least partially superimposed by at least one bonding composition that is different from their composition. Image support stabilizers made for further processing using a subtractive process are typically further processed as such. Image support stabilizers may be made of one or more polymers, if desired, image support stabilizers may have one or more other stabilizers as ingredients (e.g., they may have one or more fiber stabilizers, UV light stabilizers, doped conductive polymers, electrodes for conductive polymers, or surface preparation stabilizers). As an example, an inventive image support stabilizer might be a 2D or 3D transparent or translucent polymer form that bonds to a superimposed conventional paint, or that can be effectively incised or carved using a hand held tool. Typically, image support stabilizers that are not separating layer stabilizers do not have their function as the image's principal shape or form changed as they are processed.

It is preferable for image support stabilizers to be made with a percentage of one or more conventional polymer image supports or other conventional polymer image making media (e.g., conventional acrylic paints, gels, or sheets, or a conventional polymer film like acetate, MYLAR® or Denril made by Borden and Riley Paper Co. Inc. in Hollis N.Y.), which is up to about 60%, preferably up to about 55%, more preferably up to about 50%, still more preferably up to about 45%, still more preferably up to about 40%, still more preferably up to about 35%, still more preferably up to about 30%, and most preferably up to about 25%. Moreover, it is often desirable for image support stabilizers to be made without conventional polymer image supports or without other conventional polymer image making media with the exception of conventional polymer paints like acrylic paints. If the polymer in an image support stabilizer is comprised of a percentage (by volume) of one or more conventional polymer image making media that is preferably greater than the amounts listed above, then (a), (b) and/or (c) are typically preferable: (a) at least one stabilizer that is not an image support stabilizer (such as a fiber stabilizer, a color stabilizer like a UV light stabilizer, a doped conductive polymer, electrodes for a conductive polymer, or a defoamer stabilizer), is preferably added to the conventional polymer as part of the image support stabilizer; (b) the inventive image preferably has at least one other stabilizer that does not include conventional polymer image making media (in addition to this image support stabilizer), and/or (c) the image support stabilizer preferably also contains polymer of the present invention or the conventional polymer medium is not included in the calculation of the total polymer in the image support stabilizer.

In addition, it is generally preferable for an image support stabilizer to contain at least one stabilizer that is not an image support if the percentage (by volume) of one or more preformed conventional polymeric materials with exact, even geometric shapes or forms (like conventional polymer sheets, films, rods, bars, cubes, bowls, or spheres) used in the image support stabilizer is greater than about 65%, preferably greater than about 50%, more preferably greater than about 30%, still more preferably greater than about 18%, and most preferably greater than about 8%.

The term "e-material" is used to mean: (a) electronic paper; (b) electro-optic displays or mediums that might be bistable, flexible, paper-like, with 2, 3 or more colors, reflective and/or non-light-emissive; (c) technologies used to make these, and/or (d) similar technologies. (Note: electronic papers and/or the technologies used to make them might also be called reflective displays; electro-optic displays; electrochromic systems, electrophoretic coloration or mediums, electrophoretic displays or EPD, electrophoretic information display or EPID, electrophoretic ink, electrophoretic film or EPF, e-paper, epaper, eSign, ebooks, electronic books, e-maps, electronic newspapers, e-newspapers, organic electronic paper, smart paper, smart sign, SmartSign, SyncroSign, smart billboards, electronic ink, e-ink, eink, digital ink, digital paper, flexible displays, paper-like displays, paper quality displays, photonic ink, p-ink, radio paper, updateable radio paper, electronic reusable paper, electrochromatic display, NanoChromics, BiNem, Microcup EPD, iMoD, Gyricon, other brand names, other variations of any of these, similar names, etc.)

Underlayers, such as underpainting, underdrawing, grounds, imprimatura, primers and sizes, are one or more beginning or preparatory layers applied on an image surface with the intention that they will be partially or entirely superimposed (e.g., by painting), though they may remain visible or partially visible and contribute to its aesthetic. Both conventional underlayers and new and unique underlayers are used on inventive images. For example, surface preparation stabilizers, and separating layers (stabilizers) can be underlayers.

Inventive images are works in progress and images of art and design and include:

a) Images that are recognizable as one or more known forms of art or design, such as realistic, photorealist, abstract, geometric abstraction, surrealist, expressionist, minimalist, graffiti art, still life, figurative, portrait, landscape, modernist, folk art, primitive art, kitsch, shaped painting, installation, construction, painting, sculpture, mobile, print, photography, drawing, collage, assemblage, graphic art, architecture, furniture design, jewelry design, interior design, fashion design, product design, craft, set design, costume design, or a combination thereof.

b) Images that are recognized as art or design by a curator with proven expertise in contemporary art at an American museum of art which is accredited by the American Association of Museums or by an art scholar or an art critic with proven expertise in contemporary art.

c) Images that are original art or design.

d) Images that are interpretations, statements, expressions, or combinations of these.

e) Images that have an aesthetic that is at least minimally apparent.

f) Images that function as one or more known forms of art or design.

g) Images that are recognizable as creations by a specific individual, such as images recognizable as creations made in a specific circumstance or condition which are not ordinary circumstances or conditions.

h) Images made in limited editions, e.g., in an edition of one, preferably during their first 75 years of existence, in an edition of less than about 1500, more preferably less than about 500.

A typical process of the present invention involves the preparation of a 2D or 3D image by (i) preparing a mold or image support; (ii) preparing a PRM of one or more materials capable of forming a polymer, with other ingredients if desired; (iii) adding at least one catalyst to the PRM before or after it is put on the mold or image support; (iv) before or after the previous step or the step which follows, optionally adding at least one stabilizer to the PRM, to the cPRM (liquid or gelled), or to the polymer; (v) putting the PRM or the cPRM on at least one part of a mold or image support, made of polymer, wood, paper, stone, ceramic, metal, fabric, or glass. The inventive image making medium typically provides a shape or a form to the image.

Desirably, at least a part of an inventive image is transparent or translucent. It is typically desired that inventive images are permanent. For example, it is preferred that coloration of inventive images does not substantially change undesirably over time. For instance, over time changes such as a yellow or amber color develop on some polymers. To the extent that such changes or their effects are visible and undesirable, these polymers are not desirable for use in inventive images. It is generally desirable to use one or more stabilizers to enhance the permanence of inventive images.

After its initial polymerization, the polymer formed might for example, be the complete inventive image. Alternately, the polymer might be a work in progress that can be further developed or controlled to the extent as desired. Whether the inventive image is further processed and how it is further processed is at the sole discretion of its image maker. The inventive image can be processed in innumerable ways as desired. For instance, the polymer work in progress can be further processed repeatedly, in a myriad of ways, in any sequence, and over any period of time (continuously or otherwise). For example, its formal elements (such as its form, structure, coloration, light and spatial depth), can be reworked as desired and to the extent desired. It is likely that reworking any one of its formal elements will have at least a minimal effect on at least one of its other formal elements, such as just changing its form, might affect its structure, its color, its use of light, its function, its subject matter, its meaning, etc.

Typically, the amount of polymer in the total volume of an inventive image is at least about 5%, preferably at least about 10%, more preferably at least about 25%, still more preferably at least about 35%, and most preferably at least about 45%, in different embodiments.

The polymer of the present invention typically provides or enables an inventive image to have at least one aesthetic element. As such, polymer of the present invention is either a part of the inventive image or comprises the entire inventive image. Polymer of the present invention is not typically just a very thin, continuous, uniform, clear, colorless coating, covering, sealer, fixative, or varnish on an image that would be aesthetically complete without it. When the only polymer in an inventive image is a transparent or translucent external layer having a stabilizer that is not an image support stabilizer, and the external polymer layer has (a) and (b), described below, its typical thickness is at least about 0.2 cm, preferably at least about 0.3 cm, more preferably at least about 0.45 cm, still more preferably at least about 0.6 cm, still more preferably at least about 0.8 cm, and most preferably at least about 1.0 cm. (a) At least about 35% of the volume of the shape or form of the external polymer layer covers the image continuously, preferably at least about 50%, more preferably at least about 65%, still more preferably at least about 85%, and most preferably at least about 95%, in different embodiments. (b) At least about 60% of the volume of the external polymer layer has coloration or a lack of coloration that is uniform, but preferably at least about 75%, and more preferably it is at least about 80%.

In another embodiment of the present invention, the only polymer in an inventive image is a discontinuous transparent or translucent external polymer layer with a stabilizer, that is not an image support stabilizer. For example, such a discontinuous external layer of polymer might be carved, incised, embossed, embedded, inlaid, made of discontinuous applications (such as broken color or linear applications), colored discontinuously, or comprised of attachments, such as LEDs. Such an external polymer layer may be of any thickness or may vary in its thickness, e.g., its design may require that it be at least a certain thickness. If such a discontinuous external polymer layer is made with at least one conventional polymer image making medium and a stabilizer, and the percentage (by volume) of conventional polymer image making media in the external polymer layer is typically greater than about 25%, preferably greater than about 35%, more preferably greater than about 50%, and most preferably greater than about 65%, (c), and/or (d) are often preferable: (c) at least about 30% of the discontinuous external polymer layer is at least about 0.5 cm thick and preferably at least about 0.8 cm thick; and/or (d) it is often preferable for the inventive image to contain polymer of the present invention in another location or for the conventional polymer image making medium in this external layer not to be included in the total calculation of polymer in the inventive image.

In some embodiments, in which inventive images are made with an internal layer of polymer that is not an image support stabilizer, comprised of at least one conventional polymer image making medium and a stabilizer, and the percentage (by volume) of conventional polymer image making media in the internal polymer layer is typically greater than about 35%, preferably greater than about 50% and more preferably greater than about 60%, it is desirable that such inventive images have polymer of the present invention in another location (e.g., in another layer or in another part that may or may not be physically connected), or that the conventional polymer image making media are not included in the calculation of the image's total polymer. This preference is less desirable if: (e) the internal polymer layer's thickness is greater than about 0.15 cm, or preferably greater than about 0.2 cm, or more preferably greater than about 0.26 cm; and/or (f) the volume of the internal polymer layer's shape or form is typically at least about 40% discontinuous, preferably at least about 50% discontinuous, more preferably at least about 60% discontinuous, and most preferably at least about 70% discontinuous; and/or (g) there is inconsistent, non-uniform coloration or lack of coloration in at least about 70%, preferably at least about 80%, and more preferably at least about 90% of the total volume of the internal polymer layer.

In general, formal elements of an inventive image, can be used, or the choice made not to use them, more freely, more completely; with more workability, reworkability and control; and more in the manner desired, than in making most kinds of conventional images.

The following description of preferred embodiments of the present invention is generally arranged into sections, however, just as the formal elements are interrelated, these sections overlap. For instance, an embodiment in the "Process of Creation" section might also be an example of a process for developing and controlling an image's spatial depth, light and color. The use of one formal element in an inventive image can affect or even determine one or more of its other formal elements. Often, the workability, reworkability and controllability, offered by the artistic medium of the present invention enables image makers to use and to control the effects that work done to one formal element of an inventive image has on one or more of its other formal elements, to a far greater extent than is possible in conventional images.

Previously unknown to image makers and others, the inventive medium and inventive images offer new unique direct solutions to known limitations, problems and undesirable issues in conventional image making and images which are rooted at the heart of the formal elements, the most fundamental building blocks of images. Thus, in many examples, goals which have been sought but which could not be achieved in conventional images, can now be realized in inventive images. The new unique solutions offered by the present invention can expand image making and images profoundly. These are 24 examples. 1. While many kinds of conventional images are typically not fully workable, reworkable and controllable, inventive images typically can be, 2. While conventional practices do not always permit the free use of the Principle of Whole Development and Unity, the inventive medium typically does. Thus for example, the structure, the form, the use of light and the surface(s) of an inventive image can typically be considered, formed and unified as desired. 3. Whereas image makers often have to conform their thinking processes, their creative processes, their ideas, and their visions to a variety of limitations, problems and undesirable issues in order to make conventional images as desired, the image making processes of the present invention offer significant freedom from such restrictions. Typically, with the present invention: a) the thinking processes and the creative processes of image makers do not have to conform to such limitations at all or to such a great extent; b) image makers can develop their processes, their ideas and their visions spontaneously or as spontaneously as desired, e.g., as inventive images are formed, c) image makers can realize their ideas and their visions in inventive images, and d) image makers can often have greater control over the meaning of their images. 4. Whereas making and reworking the forms, shapes and structures of conventional images are often limited, problematic and burdened by undesirable issues, the present invention offers freedom from such. For example, using the present invention, the forms, shapes and structures of images can typically be formed as desired, within an enormous array of possibilities, using a wide variety of processes, (such as making images in layers, in parts, in one stage, in multiple stages over any period of time, combinations of these, etc.). As another example, the present invention overcomes prior limitations in creating and affecting an image's form, shape and structure such as limitations in size, scale and dimensions; weight; balance; use of negative space; Compositional Arrangement; proportion; ingredients; physical attachments; and the like. 5. While desirable, conventional see-through images have been limited. The present invention enables a vast range of see-through images to be made with unprecedented creative freedom. 6. The present invention expands the use of coloration in images, e.g., the workability, reworkability and controllability of coloration in images; and the use of coloration with real spatial depth and real light in images. 7. The present invention expands the use of light in images. Inventive images can even use light in new unique ways, a number of which cannot be done in conventional images and a number of which are desirable, important and valuable new effects in images, e.g., the present invention offers new uses of real light, of light and color, and of light and spatial depth in images. 8. Layering can typically be done in inventive images as desired, with the workability, reworkability, controllability, strength and permanence desired. Layering can even be done in inventive images as never before, e.g., the number of layers used to form an inventive image can be substantially unlimited. Layering in the inventive images can also form new and unique effects. 9. In contrast to the limitations, problems and undesirable issues inherent in using attachments (such as attached parts and inlays) in many kinds of conventional images, typically attachments are readily added to inventive images as desired, with workability, reworkability and controllability, for a myriad of different effects. 10. Whereas the use of real variable spatial depth in many kinds of conventional images is limited, problematic and burdened by undesirable issues, the inventive medium typically provides real variable spatial depth which is workable, reworkable and controllable as desired, and which offers a myriad of aesthetic options, many of which are not available in conventional images. 11. Inventive images can typically be made with strength and/or permanence not possible in comparable conventional images, which can be formed, controlled, maintained and changed as desired, using a variety of means, methods and manners, during or after an inventive image's initial formation.

12. The present invention expands the use of air pockets and embedding in images as well as the ability to form objects and devices within images. 13. The inventive medium can successfully produce images that have a vast range of special qualities and effects, many of which are new and unique, and some of which have never been possible in images before. Furthermore, special qualities and effects can typically be formed, reworked and controlled as desired in inventive images. Examples are special qualities and effects in inventive images involving the use of space, color, the perception of light, weight, balance, reality and illusion, movement, time, etc. 14. The inventive medium being typically workable, reworkable and controllable as desired, permits a wide range of experimentation, a substantial portion of which has never been done before. 15. While inventive images often need not be sealed, fixed, coated, covered or protected, they can be, as desired.

16. Whereas some uses of some of the formal elements available, desired or needed to form conventional images (e.g., some uses of real light, real transparency, real translucency, and real spatial depth), impose limiting, problematic, and undesirable specifications on the method, the manner and the means of their presentation, set-up, installation, display, and/or exhibition, the inventive medium offers ways to overcome such limitations which can result in new and unique images. For example, because inventive images can use real light in new ways, they no longer have to be lit according to conventional practices (though they can be), and because inventive images (such as 2D images like paintings, prints, and drawings) can be made with new shapes, forms, structures and/r a new sense of objecthood, they no longer have to be presented, set-up, or displayed according to conventional practices.

17. Inventive images can be made which function in ways which comparable conventional images cannot be made to successfully function. 18. Though inventive images can use reality and illusion as these have been used in the past, in addition or instead, inventive images can use these formal elements in ways that are new and unique. For example, inventive images can use real formal elements (such as real light and real space), to produce new and unique illusions. Inventive images can be produced without relying on illusions, or without illusions. 19. Inventive images can often have the quality of otherness (even inventive images which look conservative). This is a desired, useful quality that is limited using conventional practices. 20. The inventive medium expands the use of objecthood in images substantially. The use of objecthood in inventive images can even give them new and unique qualities. 21. The inventive medium opens up possibilities for new unique images within known art forms, expanding art forms in ways which could not be comparably done heretofore. 22. While the use of formal elements to form conventional images is often problematic, the inventive medium offers new and unique, direct solutions. The inventive medium expands the use of the formal elements, e.g., 3D inventive image paintings can be made using color with real light and real spatial depth that have no illusions. 23. The inventive medium permits the image maker to dematerialize volume in images in new and unique ways and in ways that go beyond that which is possible in conventional images. 24. Inventive images can typically be made as easy to care for as desired. Conservation work can typically be done on inventive images (on both their polymer parts and non-polymeric parts they may have).

The following are examples of general ways formal dements can be used in inventive images. (a) They can be used the same way as have been used in conventional images. The resulting inventive images may be like conventional images or they may differ to any extent. For example, light can be depicted illusionistically in inventive images. (b) Inventive images can use formal elements in a way that are similar to, but not the same as, in conventional images. For example, light can be depicted illusionistically in inventive images using layers of polymer. (c) Inventive images can use formal elements in new ways that resemble conventional images. For example, a polymer image support can be painted on its reverse side for viewing through its unpainted front, clear and colorless side and thus function as a reverse painting on glass. But this inventive image can be stronger, and more permanent than comparable conventional images, and it can have a wider range of optical properties such as light properties if desired. (d) The formal elements can be used in inventive images, in ways that are similar to, or that relate to, conventional uses, but which are also new and unique. For example, conventional techniques and processes, can be used in combination with unique effects of the present invention. (e) The formal elements can be used anew in inventive images to create unique, novel effects. For example, an inventive image painting can be made using paint with light from its see-through polymer form, that may have light effects within its colored or colorless layers from one or more prisms, electroluminescent lamps (EL Lamps), LEDs, conductive polymers, photochromic layers, photographic transparencies, or reflective ingredients none of which are comparably possible using conventional practices. (f) The formal elements can be used in a single inventive image in a combination of these ways.

Inventive images can, if desired, have one or more other ingredients and processes in addition to a polymer of the present invention and its process or processes, such as conventional practices. Examples are, materials, media, objects, devices, processes, and their combinations other than polymers of the present invention, such as: (1) ingredients used to make conventional images, (2) other art forms in inventive images like a traditional painting, print, drawing, photograph, or found object, (3) particles, items and other colorants, textural ingredients, other such materials, (4) devices which enable inventive images to physically move, (5) materials or devices for light and light effects and the use of conventional science to make light effects or to enable the image to give off light; (6) ordinary and custom hardware (e.g., to set up, install or mount images), and/or (7) practices used in construction, architecture, chemistry, electronics, physics, printing, or engineering. These and other non-polymeric ingredients and conventional practices may or may not have the same characteristics as they have in their conventional uses. For example, their aesthetic properties and possibilities, their workability, reworkability, and controllability and their permanence, may or may not be the same or similar to those in their conventional uses. Often their aesthetic possibilities expand when they are used with the present invention, along with their workability, reworkability, controllability, and permanence. For instance, traditional oil painting can be layered as never before in inventive images. In inventive images, however, other known, and conventional ingredients and processes may or may not have the same or even a similar aesthetic; or the same or even a similar level of workability, reworkability, and controllability; the same or similar limitations, problems and undesirable issues; the same or a similar level of strength and permanence; and other qualities which are the same or similar to those in their regular and conventional uses. For example, frequently it is the use of other ingredients with polymers of the present invention that enables inventive images to be unique and important, such as electrical ingredients, colorants, stabilizers, etc. As a specific example, the ability to form inventive images or parts thereof in layers which can be unlimited, enables many conventional practices (such as conventional paint applications) to be used in ways that are more workable, more reworkable, more controllable, freer, more versatile, easier, stronger, and more permanent than their conventional uses. Nevertheless, the characteristics of ingredients and processes other than those of the inventive medium, and the use of conventional practices with the present invention are often dependent on the specifications of each use in specific inventive images.

One or more polymers can be used as, or to form an inventive image. One or more polymers and one or more other subjects (such as other materials, media, objects, or devices) can be used in any proportion to form an inventive image. For example, an inventive image can be almost entirely made of polymer, with a very small percentage of other ingredients. It can be made of roughly half polymer, and roughly half other ingredients. It can be made with a very small percentage of polymer and a very large percentage of other ingredients. For example, one or more of layers shown in FIG. 11 might be completely made or principally made of polymer, while the rest of the layers may be made of polymer or non-polymeric ingredients. Any of the layers in FIG. 11 might be a layer of a conventional paint or other conventional image making medium, and any of the other layers might be electrically active, e.g., polymer LED(s). In FIG. 20, the internal layer shown might be an image support made of polymer and the external layer might be non-polymeric, or vice versa.

The inventive medium enables 2D and 3D inventive images to be made in any shape, form, or structure desired, using any methods, means, and manners desired, and in any size or scale desired, (ranging from very tiny to monumental in size). The inventive medium can create forms that are as precise, as delicate, and as intricate as desired, even on a very small scale. As the drawings show, inventive images can be made of one or multiple, 2D or 3D, parts or layers as desired, even in conventional forms of art and design (such as paintings and drawings where this can be problematic). Inventive images (or parts of them), may or may not be flat, continuous, or regular in shape or form (such variations are often difficult to achieve in conventional images). For example, inventive images may have protrusions; texture; undulations, curves, indentations, a concave or convex form, embossing, embedding, inlays, or attachments; layers superimposing them partially or entirely; negative space, or irregularities in form, shape, structure, or surface, etc.

A number of the illustrations (the Figures) focus on specific formal elements in inventive images. As the Figures, by necessity, were made using conventional drawing practices, such practices often hide aspects of the present invention not being illustrated. For example, it is essential to the practice of the present invention that image makers may use coloration without limitations. Yet, the use of coloration in the Figures is limited for the purposes of clarity and the Figures are rendered in black, white and shades of gray, thus they do not show the use of coloration in inventive images. For instance, for the purposes of clarity in the illustrations, variation in the coloration of a number of the inventive images shown in the Figures is minimal in order to allow their shapes and parts to be seen easily (otherwise, a single inventive image part might appear to be made of multiple parts, etc.). As another example, areas in these illustrations of inventive images which are colored darkly, might be colored lightly and they might be transparent, translucent, and/or opaque in actual inventive images. In order to create the illusion of seeing through inventive images with real spatial depth which are transparent, translucent or not consistently opaque, on the 2D planar paper of this patent which is consistently white paper, some of the Figs. illustrate inventive images using lines (e.g., black or grey, dotted and/or solid lines) in places where the inventive image depicted has no lines. As another example, for the purpose of effective illustrations, many inventive images and parts thereof are drawn with black outlines (e.g., black outlines around layers in the inventive images) even though few if any of these lines would typically exist on these or other such inventive images. And often in the Figs., dotted or gray lines are used to show changes (typically previous changes) to an inventive image. In addition, in actual inventive images, a number of the bonding spots illustrated clearly herein would not be visible to the human eye as bonding spots within actual inventive images, (e.g., because they are camouflaged to appear continuous with the aesthetic of the inventive image, for example, by their color and/or dimensions).

Inventive images and their parts may be partially or completely solid, hollow or open in form, e.g., using a polymer in hollow or solid volumetric forms, rods, bars, and strips. Inventive images can have negative space within their positive forms, between their parts, or both, e.g., negative cut-outs, perforations, or holes formed when medium is cast, carved, or cut in gelled cPRM or in polymer. This opens novel possibilities for image making and for images, such as inventive images made in conventional art forms that are completely or partially hollow, e.g., drawings, paintings, prints, collage, decollage, images with writing, graphic art, photography, tiles, partitions, windows, doors, table tops, walls, or images which are a combination of these. For example, the use of one or more air pockets, negative spaces, or both, in inventive images made in art forms which conventionally, are generally continuous and solid, can yield effects which are new and unique. For example, their hollow forms can contain something such as air, water, rose petals, a piece of silver, a lens, a prism, a mirror, a piece of crystal, or anything else inside. In addition or instead, these hollow spaces might produce one or more light effects, such as an air pocket that might form a prism or a lens, or light sources, such as LED(s), that may be inside. Hollow and solid forms can be used in inventive images to make them stabile (i.e., bottom heavy), to balance their weight, to enable images to move or to be moved as desired (e.g., for kinetic images, to enable images to float, or to make images easy to transport), so that an image can hold, carry, or contain something inside of it (such as water that must flow through an image that is a fountain), or to make inventive images function more effectively in other ways. Moreover, the formation, workability, and uses of solid and hollow forms in inventive images offer many more options than can be obtained from comparable transparent or translucent conventional images, e.g., the medium of the present invention can be significantly more workable, reworkable, and controllable than glass or crystal and it can be stronger than conventional acrylics, glass, or crystal. As another example, in the inventive images in FIGS. 41.I., II. and III., negative spaces and polymer planes enable layers of coloration to be superimposed without contacting one another.

By its variations and by its ability to be worked, reworked, and controlled as desired, the use of the inventive medium to make images' shapes, forms, and structures in some embodiments offers solutions to limitations and problems in conventional image making and conventional images, as well as the opportunity to use shape, form, and structure in images of the size and scale desired, in ways which are not possible in conventional images.

If desired, one or more parts or layers in an inventive image may be partially, principally, or completely comprised of one or more ingredients other than the inventive medium, e.g., light sources and other elements to give it light effects (such as light bulbs, LEDs, EL Lamps, reflective materials, iridescent materials, prisms, etc.); found objects; conventional image supports; conventional paints; conventional materials for making photographs; or conventional images in an inventive image. Further examples are commercially available. For example, tin cans, cardboard, metal or metallic foil, newspaper, rubber, devices (like flashlights, projectors, monitors, calculators, sensors, electrical wiring, solar panels, microphones, speakers, computers or computer parts, and controls), etc. As another example, mounts and frames for inventive images can be made using conventional practices. Attachments, parts or both which are not principally made of polymer of the present invention or are completely non polymeric can be added to inventive images, affecting or even creating their forms or structures to varying extents.

Polymers of the present invention can be formed with very accurate impressions of their molds, even if those molds are very detailed. Polymers can also be formed with less accurate impressions of their molds, to any degree desired. For example, using conventional practices, molds can be taken off of real things (e.g., a mold of a bottle, a shoe, a leaf, a person, a pineapple). In one embodiment, a 2D polymer is made in a mold. It may be left as is, if it is the desired finished inventive image or if it will be further developed at a later time, even years or decades later. Alternately, the inventive image can be further processed as desired. One method is to apply one or more colorants to one or more of its exposed surfaces. In addition, or alternately, one or more layers of one or more different PRMs or polymers can be added, e.g., a conductive polymer or a polymer with desired aesthetic or structural properties. This image can be finished, or it can be further processed. One way to further process it is to superimpose a layer of cPRM, which is the same or different from the image's initial layer, over part or all of one or more of the image's surfaces after which this inventive image may be finished. Alternately, this image can be further processed, as desired. For example, any number of additional layers can be added, or the image can be further processed using subtractive processes. The finished image may be 2D or 3D. Such an image might, for example, be a painting, a sculpture, or an image of design. For instance, it might be a rigid or partially flexible, permanent, self-supporting colored 2D or 3D image that does not require any added means of support or installation that is not considered an aesthetic part of the image. Such an image may have color visible which is at different depths within its form.

In another embodiment, an inventive image is made wherein one or more forms of light (such as light from conductive polymer or other lights), and one or more pigments or dyes are combined by (i) preparing a polymeric composition (which will be an image support), desirably made using one or more monomers, at least one of which can form a transparent or translucent polymer (in one or more layers); (ii) applying one or more colorants to one or more portions or to all of the image support; and (iii) exposing the colored work in progress to one or more forms of light or energy, to complete the image. The light can be visible light; light capable of inducing fluorescence, phosphorescence, or iridescence in the image. The energy can be energy that causes light to be emitted. Examples are ordinary tungsten, halogen, fluorescent, or neon lighting; sun light; light from fire (such as candle light); reflected light (such as light reflected onto the image off of a white wall); x-radiation, solar power, or electricity. One or more of the colorants applied on this image might by cured by radiation such as a colorant cured by UV light from the sun or from an electric light.

Whether they are stabilizers or not, image supports used to make inventive images may include one or more ingredients which are polymeric or non-polymeric. Image supports may be 2D or 3D, their shapes and forms may be of any description, and they may be made in any process desired. Image supports may or may not have one or multiple dimensions or any dimensions which remain the same after they are further processed or finished, e.g., maintaining the same length or width after further processing. For example, an image support might be an inventive image's underlying support (e.g., supporting the development of the rest of the image in a manner which resembles the way that conventional images are supported on canvases, paper, wood, bases, underlying frameworks), for instance, to make inventive images that function as paintings, drawings, collages, icons, prints, books, sculptures, photography, windows, or walls. Alternatively, an image support might be an inventive image's internal support (e.g., similar to an armature, internal skeleton, or internal framework on a conventional image), for instance, to make inventive images that are sculpture, installations, paintings, or architecture. As another example, an image support might support an inventive image externally, either without underlying it or only partially underlying it, and it may be visible or partially visible. Such an image support might be the wire or other structure for an inventive image that is a mobile, a sculpture, an installation, a construction, or a painting.

In a preferred embodiment, inventive image supports are made using the polymer, with or without other ingredients. They may or may not be stabilizers. These image supports have noticeable irregularities or imperfections in their shapes or forms. For example, they look handmade, whether or not they are, e.g., they have irregularities like those commonly seen in handmade papers and in papers with deckled edges (papers with deckled edges can look handmade when they are not). In comparison to the shapes and forms in which conventional polymer is commonly available commercially, (e.g., in smooth even sheets, and rods, cubes, pyramids and spheres with exact forms, etc.), the image supports in this embodiment are not even, perfect, exact, smooth, or they do not have other such regular or machine made appearances. Though they might be symmetrical, geometric, or machine made, image supports of this embodiment have dearly visible irregularities or imperfections in shape or form. Another example is a 3D rectangular image support with undulations or irregular bumps (not a perfect even texture). Image supports of this embodiment might be used as initial image supports. Image supports of this embodiment might be further processed as desired, e.g., as paintings. It is often desirable to further process image supports of this embodiment such that they remain the major part of the shapes or forms of their inventive images once they are completed, e.g., initial image supports of this embodiment might make up most or all of the forms of the images once they are completed.

In other embodiments, inventive images are made without initial image supports. For instance, the shape or form develops as the inventive image is made. For example, these inventive images are made without the use of underlying, internal, external, or other initial image supports. They are, for example, inventive image paintings, drawings, and collages made without a canvas like or paper like support, and inventive image sculptures made without armatures. These inventive images can be made in many ways, such as using conventional methods. For example, such an inventive image can be made of one or more polymer components that are complete once they come out of their mold, they are not further processed. Such inventive images can be made by arranging parts, which remain separate or are connected, without any single part or any set of parts serving as an initial image support. Inventive images made without initial image supports might be made in superimposed layers, none of which serves as an initial image support, e.g., these images might be made in multiple layers, some or all of which superimpose one another to some extent, partially or entirely, and these superimposed layers may or may not be physically connected to one another. Because polymers of the present invention can be made as strong and as permanent as desired, layered inventive images made without an initial image support, can be made strong and permanent enough to give inventive images the desired structure and the desired aesthetic. Inventive images made without initial image supports can typically be worked according to the Principle of Whole Development and Unity to the extent desired, for instance, in a WYSIWYG manner, whether it is preplanned, spontaneously developed, or both, e.g., they may be paintings, shaped paintings, sculptures, walls, etc., with or without negative space within their forms, etc.

In an example, all of the parts of an inventive image are connected to a single common part, e.g., an image support (which may or may not be a stabilizer), for instance, all of the parts are connected to a 2D or 3D polymer, to a piece of fiber, to a block of wood, to a sheet of metal, to a 2D or 3D mesh form, to a framework or lattice, to a common mount, frame or base, etc. For instance, an inventive image made of multiple parts one or more of which serves as an image support made of one or more parts, connecting all of the rest of that image's parts. In a second example, a fiber stabilizer is used as one part of a two part image support. On this fiber image support, a polymer part, a paper part, and a plaster part are formed. A wire mesh is used as the other part of this same image support. In a third example, ten translucent and opaque paper parts are formed on cheese cloth image support, and painted with colored cPRM. In a fourth example, multiple planar polymer parts of any shape or form, are made separately and used as an image support, to form a painting of the present invention.

Inventive images or image supports can be rigid, flexible, or they may have both rigid and flexible areas, parts, or layers. In some embodiments, inventive images are made sufficiently strong, rigid, or flexible, or they are made with other such specifications so that they can endure their function and their set up, installation, or other display practices as desired. The rigidity, flexibility, and strength of inventive images enables them to be new and unique. Examples are transparent and translucent inventive images, such as those in forms conventionally made in glass, architectural images, kinetic images, images that have to take impact, shock, that have to be transported, stored, or endure other wear.

In some embodiments, inventive images are made with rigid polymer, as strong and as permanent as desired. Inventive images, their effects, useful properties and the processes for making them, can frequently be attributed to or enhanced by the rigidity of polymers. For example, rigid polymer can facilitate superimposed applications or layers (e.g., of cPRM; weak or fragile polymers, bonding substances; conventional image making materials, non polymeric applications, etc.). It can provide support or additional support, enhance the strength, the permanence, the aesthetic properties, and sometimes the function(s) of inventive images. Rigid polymers may enhance properties of superimposed applications and layers such as (1) materials and media that tend to flake, chip, tear, or dust off of their conventional surfaces (such as layered gouache, pastel, charcoal; brittle applications and layers like some polymers and paints, and paints with high pigment content and little or weak binder); (2) applications and layers adversely effected or risking adverse effects from expansion and contraction (e.g., materials and media that must be layered in order of their rates of expansion and contraction for permanence, brittle materials and media, conventional applications on canvas or paper, and wet applications that cause or risk causing paper to buckle); (3) materials and media that are soft, fragile, weak, brittle, gelatinous, and the like, such as encaustic paint, conductive polymers, and absorbent polymers; (4) applications and tools that damage or risk damaging surfaces, such as wet applications on paper, applications that fray or tear the fibers of paper, and tools that make undesirable and often irreversible indents on conventional surfaces (like hard pencils which indent paper); (5) applications that weigh too heavily upon conventional supports such as collaged materials and found objects; (6) materials and media that conventionally require, use, or benefit from the sturdy support of a rigid surface, such as fresco, images made in relief, conductive polymers; (7) reworked applications that damage or risk damaging conventional surfaces; and (8) combinations of these. As an illustration, the uses of conventional image-making materials and media on polymer surfaces of inventive images that are limited, due to the flexibility of their conventional surfaces (like paper and fabric both of which are generally given added structural support, though they still remain flexible), can yield new and unique qualities and effects in polymers in inventive images because its flexibility can be controlled as desired, e.g., in aesthetically desirable ways. Rigid polymers can also enhance or enable the use of subtractive processes.

The strength and rigidity of inventive images enables their aesthetic and their structure to be as integrated and unified as desired, developed, and reworked in concert to the extent desired. Thus, often decisions regarding structure that have to be made in conventional images (such as use of visible reinforcement) can be ignored, delayed, or made for other reasons (such as aesthetic reasons), completely or to a greater extent in forming inventive images. Elements conventional images need for structural support may not and often do not have to be present for structural support in inventive images, though they can be used if desired. Inventive images in conventional art forms which conventionally require these added elements, do not require them at all or to as great extent as conventional images, e.g., they are aesthetic options. For example, inventive images in conventional art forms can be made without conventional stretchers, initial image supports, backings, mats, frames, stands, bases, internal structural supports (like armatures or skeletal supports), various external structural braces or other external supports; supports beneath them; cross bars, ribs or struts of various kinds. Thus the strength and rigidity of inventive images can affect their other formal elements. Among other special qualities and effects the strength and rigidity of polymer can create or contribute to inventive images are a sense of being light, precarious, airy, threatening, floating, ethereal, a sense of defying the laws of gravity and nature, or a sense of objecthood. The strength and rigidity of inventive images overcomes prior limitations in conventional images, such as paintings, shaped paintings, stained glass and other glass images, drawings, prints, photographs, and other conventional images on paper.

The forms and the structures of inventive images can be as integrated and as unified as desired, they can even be completely unified. For instance, the polymer of an inventive image can give it both its form and its structure and even its method of display. The strength and rigidity of a polymer enables inventive images to be as self-supporting as desired, (e.g., freestanding) with or without the use of additional structural supports. In some embodiments, inventive images are made that are self-supporting, or even completely self-supporting. Thus, for example, inventive images can be new unique paintings, shaped paintings, drawings, prints, photographs, books, and other forms of graphic art; they can be new unique forms of images conventionally made in glass such as windows, new unique light emitting forms, and new unique kinds of architecture. Among the notable examples of these are self-supporting inventive images made without any initial image support, inventive images made of multiple layers or inventive images made in conventionally planar or 2D art forms. The strength and rigidity of inventive images enables the integration and unification of their aesthetic, their structure, their method of installation or display, their function for visual observation, and often other functions to the extent desired. For example, such novel inventive images can be large, rigid, permanent paintings, the visible forms of which are their structures, thus, these images do not require any additional or hidden structural support. For example, such an image might have painting, printing, or drawing at real varying depths within it as well as on its external surfaces.

An inventive image can be made with a structure that is strong enough or rigid enough to be able to be mounted from a single point (e.g., from the wall or ceiling), to be able to be held securely at a distance out from the wall it is mounted on, to be able to balance supported by one or more parts which appear insufficient or unstable, or to be able to be held from a moving mount or structure. One inventive image, 45 inches in diameter, made with a crosslinked polymer that has one fine layer of invisible fiber stabilizer positioned medial within its 1.5 inch width, is hung from the ceiling using a single wire secured through the 1.5 inch width of its center. The resulting inventive image has the special effects of appearing to float, appearing light, as well as spontaneous movement, a twirling, set off by normal indoor air currents or by viewers with no special accommodations made to the space in which it is displayed to cause or affect this movement.

Strength and rigidity in inventive images can be used in many other ways too. In an embodiment, one or more parts or areas of an inventive image are sufficiently rigid, sufficiently strong or both, to support, one or more other parts or areas of it as desired.

In some inventive images and parts thereof, it is preferable to fix flexible polymer onto a backing, mount, brace, stretcher, or another such structural support, for example, a flexible polymer secured over a curved metal form, a board, or over a conventional stretcher. (Refer to strengthening stabilizers described herein.) As an example, a transparent polyvinyl chloride inventive image is made, painted as desired with transparent, translucent, and opaque coloration (such as inks and paints made using oil soluble dyes), and finally draped on the wall. In another example, three small painting surfaces are made with a clear transparent silicone elastomer, irregularly colored, with embedding. They are mounted on support structures and hung on the wall or from the ceiling. In a further example, one or more flexible polymer parts in a kinetic inventive image might move.

Unlike many conventional images, inventive images can be as strong and as permanent as desired, and these properties can be formed, reworked, and controlled using any methods, means, and manners desired, such as when forming a polymer or anytime afterwards, often without affecting its aesthetic undesirably. The strength or permanence of inventive images may or may not be consistent. It is generally preferred that inventive images be strong and permanent, to the extent that there is no conflict with a more desirable preference for a specific inventive image. It is generally preferable for everything physically connected to inventive images to be bonded to them. Methods for controlling and enhancing the strength or permanence of inventive images are described herein. If, for example, two superimposed polymers do not bond together, or if they do not bond together as well as desired, bonding methods described herein or conventional bonding methods might be used. All desirable methods, means, and manners for achieving the level of strength and permanence desired in inventive images can be used. It is generally preferable that reworking and cleaning inventive images not decrease their strength or permanence, and that such practices depend on specifications of and undesirable changes to individual images.

Polymer in an inventive image may be strengthened further, made rigid or more rigid, or its permanence enhanced by thickening it or reinforcing it. This might, for example, be done with a fiber stabilizer, with a stronger polymer (such as one that is rigid or crosslinked); with a non-polymeric material (such as metal, or wood). (Refer to other descriptions herein such as strengthening stabilizers.) In some embodiments, strengthening elements are physically bonded to inventive images, such as a strengthening element that is an image support, a mount, a frame, embedding, an attachment, or an inlay. Some strengthening elements which are physically bonded to polymers are stabilizers. Further examples are image support stabilizers, fiber, wire mesh, and other metal mesh, netting, macrame and other knotted forms (e.g., made of wire or string), forms made of linked chains (e.g., metal or plastic), other open weave forms that are not fibers or that are combinations of fiber and other materials (such as woven straw, string, wire, grasses, strands of rubber or leather, ribbons, stems, or strips of bark).

Any and all ingredients used in or on inventive images can affect their strength and permanence, as can processes used to make inventive images. Some polymers are stronger than others (e.g., crosslinked polymers and certain polymers are stronger for particular uses, etc.), some are more resistant to particular elements, and some polymers are more permanent than others. Manufacturers of polymer forming materials generally provide useful information about the properties and conventional uses of their products.

In various embodiments, inventive images are designed with two or more different polymers that are at least partially superimposed or connected. One or more of these polymers might be in layers, parts, or applications in or on the image (e.g., on the other, different polymer or polymers). The compositions of these polymers may or may not also contain non polymeric ingredients. At least one of these superimposed or connected polymers in the images of these embodiments provides or enables the image to have at least one aesthetic element, such as emitted light, other light effects, video effects, coloration, optical effects, transparency, translucency, the ability to bond to at least one superimposed medium (such as a colorant like paint or ink), or the ability to be developed by subtractive processes. In addition, at least one different polymer in the polymeric compositions of these embodiments, provides support to the polymeric composition. Thus, for example, a polymer which is desirable for use in an inventive image for aesthetic purposes, but which is weak or less strong or permanent than desired, is strengthened or made more permanent, and often is made more functional in the image desired too. Such designs using different polymers are often desirable in the use of absorbent polymers, conductive polymers, flexible polymers, and other polymers that are aesthetically desirable but might be weak.

In some embodiments, inventive images are made that are less strong or less permanent than they might be, as an aesthetic choice, to facilitate the process of creation desired, or to enable the image to function best for its purpose or for one of its purposes.

When using more than one kind of material or medium in an inventive image, and these different ingredients are not on physically separate parts of the image, it is desirable to be mindful of differences in the parameters of their expansion, such as differences in their coefficients of thermal expansion and differences in comparable parameters of any other kind of expansion (like expansion due to absorption of moisture such as humidity absorbed by a hydrophilic plastic or by paper in an image). When differences in the parameters (coefficients) of expansion of different inventive image ingredients are significant or great, it is desirable to ensure that these differences do not risk or cause undesirable effects to the resultant inventive image (such as a decrease in its strength, actual cracking, or bending or the risk of loss of strength). It is preferable that all measures taken for this purpose be tailored to the precise specifications of each inventive image, e.g., ingredients can be substituted, or the image can be designed to avoid or decrease the likelihood of such undesirable effects.

As a further illustration, if the difference between the parameters (coefficients) of expansion of different ingredients within an inventive image are significant or great, and if the area of contact between them is significant or great, it is generally desirable to make changes which reduce or eliminate these differences and their potential undesirable effects, such as by the following example methods. (1) Alter the size of the area of contact between the ingredients so that it is insignificant or minor. For instance, subdivide one or more of the ingredients so that areas of contact are discontinuous, and spaced as far apart as possible. (2) In the area of contact between the ingredients, interpose one or more materials, media, objects, devices or combinations of these, that are elastic enough or that flow freely enough to absorb the differences in their expansion and contraction. (3) In the area of contact between the ingredients, interpose one or more other materials, media, objects, devices or combinations of these which have intermediary parameters/coefficients of expansion to form a transition from the ingredients with the different parameters/coefficients of expansion. (4) Use a combination of these solutions. These solutions will not work in all circumstances in all inventive images, or they will not be equally desirable. For example, (2) and (3) are not generally desirable with 3D embedments. With large 3D embedments, it is generally preferable to match or approximately match the coefficients of thermal expansion and other expansion of different individual inventive image ingredients.

Thus, it is often desirable to be aware of such significant differences in coefficients of thermal expansion when embedding; inlaying; when adding layers, when connecting or adding parts and other attachments; when adding other coloration; and when installing mounts and frames.

For example, it is desirable to be mindful of significant differences in the coefficients of thermal expansion between inlays on inventive images and their host surfaces when the inlays are large and completely or continuously bonded to their host surfaces. It is also generally preferable to be mindful of significant differences in the coefficients of thermal expansion between the fiber and the image part to which it is bonded such as when using layers of fiber, dense fiber, tightly woven fiber (e.g., glass cloth), areas of chopped fiber. Also, some polymers expand and contract significantly, while others do not. For example, hydrophilic and absorbent polymers expand and contract at different rates as they absorb substances (like water or paint) and as these substances go out of them. Thus, when using an absorbent polymer (e.g., part or layer, such as a surface preparation stabilizer), it is most desirable that its expansion and contraction not alter its bond to any different compositions on the image undesirably. As another example, mixed polymers (such as stabilizers) are often desirable for use in between different polymers in an inventive image when they have coefficients/parameters of expansion that are significantly or greatly different.

In another example, a polymer is painted with a paint whose vehicle is a bonding cPRM with a compatible coefficient of thermal expansion. Then, before applying a continuous material with a significantly different coefficient of thermal expansion over 90% of this painted polymer, one or a combination of the following three methods may be used to effectively reduce or eliminate the risk to this image's strength and permanence. (1) The initial continuous material is replaced by one with a coefficient of thermal expansion which is as close as possible to that of the polymer. (2) The initial continuous material is cut into smaller pieces and then applied to the painted polymer, e.g., as a discontinuous non polymeric Separating Layer, for instance made of metal. (3) One or more intermediary layers are applied to the painted polymer arranged so that their coefficients of thermal expansion provide a progressive transition between that of the painted polymer and that of the continuous material. Then, the continuous material is applied onto the intermediary layer or layers on the painted polymer.

Regardless of the method of their incorporation, it is preferable for each non polymeric ingredient in contact with cPRM, to be able to withstand the cPRM, the polymerization process (such as its heat), and its inclusion in or on the polymer and in or on the inventive image over time without undesirable consequences to it, to the inventive image, or both. This condition is often preferred for many inlaid, embedded, and attached non polymeric ingredients. If this preferred condition is not met, it may be desirable to create it by making and test samples.

One preferred method useful in many embodiments is to change non polymeric ingredients in a way that protects them from the risk of undesirable consequences resulting from their innate inability (or the risk of this inability), to withstand the cPRM, the polymerization process, to have and maintain the aesthetic desired in the formed inventive image, or to remain permanently as desired in the inventive image over time. For example, many non-polymeric ingredients can be sealed or coated with a protecting agent (by spraying), prior to their inclusion in or on inventive images. It may be preferable to seal such ingredients with one or more stabilizers or with substances which contain one or more stabilizers, such as sealants or coatings. For example, a UV light stabilizer can be added into an acrylic medium, a varnish, or in both, to seal small pieces of paper before they are mixed into cPRM, and coating might be applied on organic materials before they contact cPRM. Non polymeric inventive image ingredients might reinforce it in an aesthetically acceptable or desirable way, to withstand inclusion in or on the polymer without undesirable consequences. For instance, small paper forms which will be stirred into a cPRM may be reinforced beforehand by thickening each of them with additional paper pulp, cardboard, wood, thin metal, fiber stabilizer, or a coat of paint. Fiber can be used to reinforce inlaid, embedded, connected, or attached non polymeric ingredients. For example, delicate red rose petals could be sprayed with a transparent, colorless polyurethane varnish to protect their color and form before they are added into cPRM. In addition or instead, one or more stabilizers might be used as sealants. It may be preferable to use one or more stabilizers in one or multiple of the aforementioned sealants or coatings used on non-polymeric ingredients prior to their inclusion in inventive image. A paper form may be sealed with an acrylic medium that contains an UV light stabilizer, prior to being inlaid in a polymer inventive image, whereas without this protection, this paper may turn yellow or brown with exposure to UV light, and, it may also be undesirably deformed or damaged by moisture.

Absorbency In some embodiments, polymer in inventive images can be: absorbent, not absorbent, hydrophobic, hydrophilic, or a combination thereof. These are collectively referred to as "absorbency level" or "absorbent level." One preferred method of forming such polymers is by using particular active ingredients in cPRM and/or one or more particular stabilizers in cPRM, on polymer, or a combination of these (e.g., a fiber stabilizer). In addition or instead, such polymers can be formed using other ingredients in and/or on polymer, such as absorbent papers, paper pulp, colorants and strands of various kinds. Examples of desirable uses of polymer that is hydrophobic, hydrophilic, absorbent, and/or not absorbent are: (1) as a final coat on inventive images, e.g., nonabsorbent surfaces desired for permanence; (2) as surface preparation stabilizers (so that paint might soak into an absorbent polymer); (3) for forming image supports (such as absorbent image support stabilizers); and (4) for visual effects on inventive images (e.g., with superimposed coloration); or combinations thereof. Among examples of mediums or colorants which might be desirable to superimpose onto absorbent polymer in forming an inventive image are: paints, dyes, inks, primers, binders, or photographic emulsions.

Because the absorbent level quality of the polymer in inventive images can differ from conventional practices, conventional practices which use these qualities (e.g., materials, media and techniques) and effects used in conventional images dependent on these qualities (e.g., effects of painting, drawing and printing on absorbent paper, canvas, or other fabric) can be used with the inventive medium for effects and images that are new and unique. For example, unlike conventional images, all effects using the absorbency level of the invention may typically be transparent, translucent, and/or opaque; colored and/or colorless; combined with one or more other additive and/or subtractive processes (such as incising, carving and/or inlaying); used with a myriad of other aesthetic variations (such as light effects); worked, reworked and controlled; and be as strong and permanent as desired. In contrast, many such options are not possible in conventional image making, particularly using paper or fabric image supports. The following are more specific examples of the absorbency feature of the invention.

Using hydrophilic and/or absorbent polymers, inventive images can be made with new effects of real light, color, real transparency and real spatial depth, e.g., effects of stained, bleeding and poured color. In preferred embodiments, a synthetic absorbent polymer inventive image surface is superimposed by one or more mediums that might for example be paint(s), dye(s), ink(s), primer(s), binder(s) and/or photographic emulsion(s), e.g., which may bond to t absorbent polymer.

In preferred embodiments, an inventive image is made using at least one synthetic absorbent polymer capable of absorbing more than, for example, about 20% of its weight in water. In preferred embodiments, an inventive image is made using a synthetic absorbent polymer that is capable of being penetrated by an oil soluble dye. The absorbent polymer(s) in such inventive images might, for example, be polyvinyl chloride or polystyrene. Inventive images made in these embodiments might be further developed, for example, with one or more applications of which might be mixture(s) containing oil soluble dye(s) and solvent(s), or which might be oil soluble superimposed medium(s), e.g., paint(s), dye(s), ink(s), primer(s), binder(s), or photographic emulsions. Absorbent polymer formed in inventive images in these embodiments might be plasticized with a stabilizer to accelerate penetration of the oil soluble dye thereinto.

In an illustration, an inventive image is made using an absorbent polymer such as 2-hydroxyethyl methacrylate (HEMA), mono-glycerol methacrylate, and/or another polymer which either has the same or a greater number of oxygens than glycerol. For instance, using such an absorbent polymer, an initial image support stabilizer is made which is then superimposed by conventional paints and/or inks which absorb into it to varying extents forming a 2D or 3D inventive image painting which may be viewed from one or multiple sides, as desired. In an example, such an absorbent polymer is used (e.g., with a colorant mixed into it) as a surface preparation stabilizer on an inventive image and then superimposed by colorant(s) which absorb into it to form an inventive image. This might be the completed image desired, but if not it might be further processed, such as by incising drawing into it, and then optionally filling in some of this incised drawing with cPRM, such as cPRM that is a colorant (e.g., paint with a cPRM binder which may perhaps be cured by a radiation stabilizer), and/or this image may by superimposed by other coloration on one or more of its sides, e.g., coloration which absorbs into the newly formed polymer.

In preferred embodiments, an ingredient that modifies the absorbency of polymer is added to polymerization reaction mixture or to a polymer. This ingredient is a stabilizer.

In a preferred example, in embodiments, an inventive image is made of a mixed polymer or a copolymer comprised of at least one absorbent polymer and at least one polymer that is not absorbent. Thus for example, the absorbent polymer ingredient(s) might provide the image with aesthetic qualities (e.g., enabling desired further processing such as superimposed applications), while the nonabsorbent polymer ingredient(s) might provide the image with desired physical, structural and/or dimensional properties such as stability, strength and/or permanence.

In preferred embodiments an inventive image is formed by placing a PRM or cPRM capable of forming an absorbent polymer on a support surface where it polymerizes. The support surface may be a mold, or it may be wood, paper, stone, ceramic, metal, fabric, polymer and/or glass. In embodiments, an absorbent polymer or a cPRM containing at least one polymer that is absorbent, is superimposed on an image support comprised of a different polymeric formulation which provides support to the image, enhancing the structure, stability, strength and/or permanence of the superimposed absorbent polymer layer. In preferred embodiments, an image support (e.g., stabilizer) is made with a first, non-absorbent polymer layer bonded to a layer of a second, absorbent polymer, e.g., made with a synthetic absorbent polymer. In these embodiments, the second polymer may for example, be made with polymers) having hydroxyl, amide, amine, ester, or ether functional groups, or, the second polymer might, for example, be made with alkyl acrylate(s), alkyl alkacrylate(s), and/or functionalized derivative(s) thereof. The second polymer might, for example, be made with 2-hydroxyethyl methacrylate (HEMA), it might be made with 2-(Acetoacetoxy)ethyl methacrylate, and/or it might contain no more than, for example, about 4% (by volume) HEMA. The first, non-absorbent polymer layer might, for example, have about 10% (by volume) of absorbent polymer.

When added into or on cPRM or into or on polymer in an inventive image to form or fortify the bond between the polymer and one or more superimposed applications and/or colorants upon it, one or more absorbent polymers, and cPRM or PRM which forms absorbent polymer, are preferred stabilizers.

Inventive images can have effects which rely on the absorbency of polymer being less than or different than that of comparable conventional images, as well as effects which rely on the lack of absorbency of polymer. Examples are effects made by using conventional applications on polymer inventive image surfaces, which are conventionally used on absorbent surfaces, like canvas or paper. For example, among these are inventive images and effects made by working, reworking and controlling applications from bleeding, staining, running and absorbing into inventive images undesirably. Such an effect can be seen in the use of color on the inventive image support illustrated in FIG. 5 VI. which may have an absorbent surface. Also, inventive images and effects can be made in processes in which applications are reworked, e.g., intentionally removed, erased, smudged, rubbed, blotted, etc. (Often working and reworking the surfaces of conventional images is limited and problematic, for instance it tends to fray, tear, or break these surfaces undesirably, e.g., paper or fabric surfaces). Unlike many conventional image supports, many kinds of polymer surfaces of the invention can undergo working and reworking without being undesirably changed in an irreversible manner. The polymers of the invention are not typically fibrous, interwoven, or made of macroscopic strands like many conventional images, though such elements can be used in inventive images e.g., fibers, paper and strands of all kinds can be used as part of inventive images, for example, on and/or in their surfaces.

E-Materials

In embodiments, inventive images are made with or of e-materials; reflective displays or mediums; electro-optic displays or mediums, and/or electrochromic systems. These materials may for example, be bistable, and they might change in at least one optical property (a formal element such as color) in response to energy, an electric field, an electromagnetic field, electricity, light, and/or radio wave. Such materials may have nanomaterials or smart materials, or they may be nanomaterials (e.g., hybrid nanomaterials) or smart materials. Examples often preferred might be: flexible, thin or very thin, reflective or non-light-emissive, paper-like, made in a roll to roll process, made with polymer electronics or conductive polymer electronics, made by printing process(es) and/or made to be as lasting and as permanent as possible. E-materials typically have changeable or rewritable coloration. This coloration is typically changed or rewritten using a trigger, stimulant or influence that is typically energy or electricity. E-materials are typically bistable, they typically only require energy or electricity to transition from one stable or resting state to another, to change their coloration or visual presentation. It is preferable that e-materials do not require any energy or electricity to display and maintain still or unchanging coloration, e.g., it is preferable that they do not need electricity, energy or refreshing to keep or maintain static coloration. If this is not possible, it is preferable that e-materials only require low or minimal power, energy or electricity to present and maintain still or unchanging coloration. E-materials may be made using any of a number of different technologies or combinations of them, e.g., electrophoretic technologies, cholesteric liquid crystal (CLC or ChLCD) technologies, etc. E-materials are typically light reflective, examples are designed to be read by reflective light like paper, books, newspapers, signs, printed materials, etc. Among the exceptions are e-materials that are illuminated, light emitting, and/or transparent, e.g., those that are illuminated for viewing in dark places; those that have OLEDs, PLEDs or other LEDs, those in European Patent EP1118039, transparent NanoChromics (see www.ntera.com and description below). Examples of e-materials are made with polymer or polymer image supports that may be stabilizers, e.g., they might be made with two or more different polymers; semi conductive or conductive polymer(s); an image support formed of two or more layers, etc. E-materials might be made with nanomaterials and/or nanotechnology (see description below). Non-polymeric e-materials might also be used to make inventive images. E-materials in inventive images or parts thereof might be further processed as desired, e.g., using additive processes (like painting, printing, adding parts or layers, collage, adding polymer), and/or using subtractive processes (like cutting, perforating, sanding, etc.), refer to examples herein and in US Patent Application No. 20030035917-A1. Further description and examples of e-materials follow, they are easily found on the Internet, and they are in US Patent Application No. 20030035917-A1 (refer to examples using microcapsules and by E-Ink Corporation). More examples of e-materials will be developed in the future that may be used in inventive images.

Conventional e-materials typically are made to conform to limitations that do not exist in the use of e-materials in inventive images. Examples are limitations that facilitate the utilitarian uses of conventional e-materials, such as limitations pertaining to their portability, their legibility (e.g., the desire for high contrast and clarity in the coloration forming text and graphic elements), their permanence (e.g., making them tough, resistant or impermeable to elements that reduce their permanence, etc.), making them practical (e.g., having a rectilinear shape, light weight, thin, easy to use, smooth consistent surfaces, keeping their cost as low as possible, etc.), making them resemble paper (e.g., making them easy to read (paper is often considered easier to read than a computer screen), making it easy for e-materials to take over uses of paper products, conventional signs and related products), etc. In contrast, the use of e-materials in inventive images is unlimited—it may or may not fall within some or all of the limitations restricting the use of e-materials in items and products that are not images. These are further examples. In inventive images, e-materials may or may not resemble paper or resemble paper well. They might not resemble paper at all. They may not function in a way that enables them to take over the uses of conventional paper, or to do so easily. In inventive images, e-materials or part thereof may or may not be viewed or viewed entirely by reflective light. They may emit light, they may be illuminated, they may transmit light, or they may be transparent. While it is typically desirable for the resolution of conventional e-materials to be very good or excellent, the resolution of e-materials in inventive images may be of any description desired. The coloration of e-materials used in non-images often resembles that of conventional text and/or graphic or design elements conventionally used with text (or it is made with this objective). It may for example be made to resemble conventional printed text, and/or conventional text on sheets of paper, books, newspapers or signs (e.g., text in one consistent color with one consistent contrasting color, usually white, in the background; text in black with a white or almost white background; blue text with a white or almost white background; white text with a blue background, etc.). In addition or instead, coloration in conventional e-materials might resemble graphics or design elements (that are not images), of a kind conventionally used with text, e.g., graphics for communication, information, education, marketing, promotion, illustration, or another utilitarian purpose. Inventive images have no such limitations, their use of the changing or rewritable coloration of e-materials is unlimited, it may be used as desired, e.g., they may use as few or as many colors as desired (for instance ranging from using just one color to using a full range of color), using contrasting and/or subtle coloration, using text and design elements that may or may not be clear or legible, using aesthetic elements that may or may not be utilitarian or understandable, they may use transparency, etc.

Whereas the conventional sizes, shapes and forms of e-materials used in non-images are typically made to resemble conventional forms presenting text for reading (such as: forms that are like paper, newspaper, books or signs; rectilinear shapes; forms that are thin, very thin, about 200 microns thick, about 100 microns thick, about 0.3 mm thick, or about 0.2 mm thick or less; forms that are light weight, with smooth consistent surfaces, etc.), inventive images or parts thereof made with or of e-materials, may have any size, shape or form desired, and these formal elements might change if desired. For example, in inventive images, e-materials may be thin, very thin, thick or very thick; they may be uniformly smooth, even, consistent throughout, irregular, textured, uneven, perforated, inconsistent in one or more ways; they may have irregular shapes and/or forms; they may be light weight, heavy or very heavy; they may be two or three dimensional; they may be on the surface of an inventive image or part thereof that is substantial in size or large, etc. Whereas the layer or layers of coloration in conventional e-materials is typically limited to even films or thin layers, the layer or layers of coloration in e-materials in inventive images may have any thickness and any level of smoothness, and any level or regularity desired, e.g., for aesthetic purposes. Also, many conventional e-materials are made to be portable or easily portable, often for utilitarian purposes (e.g., various forms of electronic paper made for non-images are made to be like paper, they are made to take over the functions of paper, they are made to be handled, read and carried easily, etc.). Some conventional e-materials are not portable or not easily portable often for utilitarian purposes (e.g., e-materials made for signs or large signs that need to stay where they for some time may not be portable or easily portable). The portability or the lack of portability of e-materials in inventive images and of these inventive images might or might not facilitate a utilitarian purpose, e.g., it may be the result of aesthetic choices. E-materials in inventive images and these inventive images may be portable, not portable or only portable with difficulties (e.g., they may be big, too heavy, too fragile for example they may have superimposed applications with surfaces that are fragile or vulnerable to damage; they may have irregular or protruding attachments or parts that make them difficult to handle or carry; and/or they may have too many parts to be easily portable, etc.) Also, whether they are conventional or they are in inventive images, e-materials may be rigid and/or flexible. They might for example, open like a book, a magazine, a newspaper, a notebook, a scroll, an architectural blueprint, etc., e.g., resembling conventional paper. They might be folded, and/or they might roll up (even tightly or very tightly, e.g., tightly enough to fit into a tube that may be about 7.5 mm in diameter, about 4 mm in diameter or less). Alternately unlike typical, conventional e-materials, e-materials in inventive images may be volumetric forms, objects, walls, ceilings, large structures, linear sculptures, or e-materials might just be on the surfaces of such forms, etc.

Inventive images or parts thereof made with or of e-materials might use electricity in any form and they may only require low power. They might for example run on batteries, on solar energy, photovoltaics, or a combination of these (e.g., forms of these that are thin, very thin, lightweight, small or a combination of these, like thin film batteries or slim line batteries, refer to batteries herein). Inventive images or parts thereof made with e-materials might be driven by polymer electronics, organic electronics, circuits made with organic or polymer semiconductor materials, or active matrix polymer electronics. They might use thin film transistors (TFT), polymeric transistors, flexible transistors, TET arrays, active matrix backplanes, active matrix TFT backplanes, flexible backplanes, ink jet printed active matrix backplanes, direct drive polymer backplanes, low temperature polysilicon TFTs, flexible microprocessors, any of these examples or others on a polymer image support (that might be a sheet, a film, flexible, three dimensional, or of another description), or a combination of these. Refer to "Flexible active-matrix electronic ink display" by Chen, Y. et al. in Nature 423, 136, 2003. Examples of e-materials for in inventive images may have writing methods or methods to change their coloration that may be electric, magnetic, influenced by light (photochromic methods), thermomagnetic (e.g., using leuco dye, thermochromism), and/or other methods. Examples of e-materials from these embodiments are made by or made using technology by Seiko Epson; by Lucent Technologies, Murray Hill, N.J. (such as their flexible transistors, e.g., for e-materials by E-Ink); and/or by Plastic Logic, Cambridge UK (e.g., for e-materials by Gyricon Media of Ann Arbor, Mich.). In an illustration, the circuitry for e-materials may be made using an organic material that can function as a semiconductor (e.g. pentacene), on an image support that may be polymer and/or flexible. For examples refer to Philips and Polymer Vision in Eindhoven, the Netherlands and "Flexible active-matrix displays and shift registers based on solution-processed organic transistors" Gelinck, G. H., et al., online in Nature Materials, Jan. 25, 2004 (see http://dx.doi.org/10.1.038/nmat1061) and in Nature Materials Feb. 1, 2004.

E-materials in inventive images or parts thereof may have preprogrammed displays, they may store information or images (e.g., even in large quantities); they may download from the Internet or provide Internet access; they may be controlled or operated by viewers; they may be self-actuating, self-writing or changing their coloration themselves; they may have a unit or part that rewrites or changes the coloration (it may or may not be physically separate from the rest of the inventive image); they may be controlled or operated using a stylus or wand device, by touch controls, by movement, gesture, sound or voice recognition technology, by a printer-like device that they pass through, and/or remotely controlled, e.g., receiving broadcasts, information over a network, via wireless communication and/or from the Internet. Thus, for example, inventive images with e-materials might have graphics, text, other images, coloration, aesthetic elements like lines or circular forms, or a combination of these that change as desired e.g., in a design, randomly, in a manner that is organized, orderly or logical; they may change uniformly (such as a uniform color change or a change from one subject or abstract element to show another), etc. The coloration or display of e-materials might change at any rate, for example, ranging from changing from one still presentation to another when triggered (such as when a viewer presses a touch control), to changing very quickly or at video speed (such as to show movies). Process (es) such as electrowetting processes might be used in making e-materials that may enable faster, quick or very quick switching, e.g., in about 10 milliseconds or about 100 frames per second (which is about four times the switching rate of the average VCR). Refer to "Video-speed electronic paper based on electrowetting" by Hayes, R. A. and Feenstra, B. J. in Nature 425, 383-385. Refer to electrowetting processes by Royal Philips Electronics.

Conductive Polymers and Related Subjects

In various embodiments, conductive polymers and monomer precursors may be used in inventive images. They may, for example, enable or create desired aesthetic and/or utilitarian effects in inventive images. In making inventive images, both the process of doping or treating polymer so that it becomes conductive or more conductive, and the dopant or agent used in such processes, are stabilizers. For example, a polymer might be doped so that electrons are removed such as through oxidation (e.g., with chlorine, bromine or iodine vapor, or halogen doping) or so that electrons are introduced such as through reductive doping (e.g., an alkali metal). It is often preferable to use conductive polymer in inventive images in layers with one or more non-conductive layers which may or may not be comprised or entirely comprised of polymer. Often layers of conductive polymers in an inventive image are thin or extremely thin, e.g., enabling them to be very light weight. Thin, for example, can refer to less than about 1 mm, preferably less than about 0.2 mm. In one preferred embodiment, the thinness can be only about 0.01 to 0.1 mm. An inventive image may be partially or entirely made of conductive polymer, but often inventive images made with conductive polymer are partially non-conductive, e.g., non-conductive layers and/or portions. Conductive polymer and/or cPRM capable of forming conductive polymer may be used in inventive images. Conductive polymers are, for example, desirable in making inventive images for their ability to conduct electricity, such as for their ability to emit visible light, e.g., using conventional practices to set up and install the image for such purposes. Electroactive conductive polymer can be desirable in inventive images. In selecting and in forming a conductive polymer for use in an inventive image, the level of electrical conductivity can be precisely controlled over a wide range. If desired, a particular conductive polymer can also be blended with one or more other polymers to produce the desired medium for use in an inventive image. Conjugated polymer systems can show electroluminescence. As illustrations, an inventive image made with conductive polymer capable of emitting light is installed so that it gives off light. An inventive image may be made with a polymer light emitting diode (LED) using conductive polymer, or a polymer LED might be an inventive image. A polymer LED inventive image or part thereof might, for example, be made with precursors to homopolymer and copolymer polyphenylene vinylenes (PPVs), such as polymer LEDs made by Cambridge Display Technology of Cambridge, UK.

Light emitting polymer (also called LEP) devices, are a kind of light emitting diode. They are also called polymer light-emitting diode (PLED, pLED or polyLED), organic light emitting diode (OLED, oLED, poly OLED, Poly OLED), and organic electroluminescent (EL).

On an image support or other inventive image surface, conductive polymer might be used for marking, as a colorant, and/or as a coating, which may be electroactive, e.g., which may illuminate if desired. Conductive polymer might be used in and/or on inventive images, for example in the forms of PRM or cPRM inks, paints, colorants, coatings, dots and/or pixels which may be electrically active, e.g., which may illuminate in one or more colors or create other effects in images. These might, for example, be painted or drawn on, and/or they might be applied by an ink jet printing process. A simple coating process can be used to apply conductive polymer (such as a light emitting polymer) to a surface. Conductive polymer might for example, be applied onto an image support (e.g., stabilizer) in a manner which provides the image with a desired aesthetic which may be as simple or as complex as desired, for example, adding a pattern, a design, drawn or painted shapes, alphanumeric shapes (which may or may not be legible), and/or pixels to the image, e.g., using one or more painting and/or printing processes. In various embodiments, conductive polymer layers can be applied by painting and printing application processes, spin coating processes, as well as other processes on an image support or other inventive image surface. Conductive polymer, such as that applied on an image surface by painting and/or printing, might, for example, be connected to at least one electrical power source.

Conductive polymer might also be used in inventive images for batteries and/or solar cells, e.g., solar calls made of polyvinyl alcohol (PVA) and polyacetylene such as in films of the copolymer as those patented as Lumeloid, Alvin M. Marks inventor. Conductive polymer might be used give an inventive image the element of sound or to contribute to its element of sound, e.g., recording sound, responding to sound (such as voice command, footsteps, or music), and/or emitting sound of any kind. Conductive polymer might also be used in inventive images for transistors, capacitors, coatings, photovoltaics, photodiodes, photoconductors, photorefractive devices and sensors, conductive adhesives, conductive coatings, circuits, as inks, paints and/or other colorants, computer memory and hard disks, sensors, for similar uses and for other uses. For example, a polymer solid state laser could be used in an inventive image, feeding energy to it with a conductive polymer "wire" or conduit. In a further example, electricity could be generated in an inventive image from a conductive polymer photovoltaic device that is hidden or that receives an invisible light, or both. Although conductive polymer can be used to reduce static on photographic film and computer screens which are part of inventive images, it is preferable that conductive polymer used for such purpose in an inventive image is not considered part of that image's polymer of the present invention and thus it is preferable that conductive polymer used for such purpose is not included in any calculation of that image's total amount of inventive polymer.

Inventive images made with conductive polymer can be in any shape, form or size desired. Conductive polymer in inventive images (e.g., as a LED) can be formed as desired. It can for example, be in any or all 2D or 3D, non planar or planar forms, as desired, such as in the form of sheets, as films, as fiber of various types such as fabrics (e.g., for use as a canvas); as rods, strips or bar shapes; in volumetric forms (Which might be hollow and/or solid), in other forms, and/or in a combination of forms. Conductive polymer in inventive images and inventive images made with conductive polymer, (e.g., images that emit light from conductive polymer) may be transparent, translucent and/or opaque, as desired. Moreover, they might be flexible and/or rigid (e.g., a self-supporting image that is partially or completely rigid, or an image that can be rolled up, draped, folded, or flexed). For example, a polymer LED inventive image or part thereof might be on an image support made of polymer, film, metal, foil, glass and/or any other non-polymeric material. A polymer LED inventive image, or portion thereof, is preferably transparent, translucent, or partially opaque. An image support (e.g., stabilizer) for such a polymer LED might be transparent, translucent, and/or opaque, it might also have other marking or coloration, other light effects, negative spaces, incising, and/or other aesthetic effects. The polymer LED might for example contribute to the aesthetic of the image, e.g., providing a design, a drawing, light effects such as reflectivity, other light effects described herein, etc. For instance, polymer LED devices might be on commercially available ITO (indium tin oxide) coated PET (polyethyleneterephthalate), and if desired, subsequently encapsulated with a transparent or translucent, rigid and/or flexible barrier on one, two or more sides, e.g., to protect against the ingress of moisture, water and oxygen.

Conductive polymer (e.g., a polymer LED) might be: (a) an underlayer in or on an inventive image, (b) within an inventive image, (c) on one or more of its external undersides and/or front external sides; (d) attached to, connected to, inlaid in and/or embedded in an inventive image, and/or (e) a part of an inventive image which is physically separate from the rest of the image. Conductive polymer enables one or more sides, surfaces and/or internal areas of an image, or all of an image, to be electrically active and/or light emitting in one or multiple emission colors, as desired. Inventive images made with conductive polymer (such as inventive images with polymer LEDs, or other electrically active polymer), might for example, be paintings, drawings, sculptures, constructions, shaped paintings, collages, prints, drawings in space, cut-outs, Light Art, Computer Art, Light and Perceptual Art, Video Art, art with film, an Installation, an image that serves as a wall or as an image on a wall, a table, a bench, a window, a tray, a howl, a floor, graphic design, clothing or fashion design, book design, another kind of design or architecture, a combination of these, etc.

Conductive polymers are one of many ways of creating light emitting image supports (e.g., stabilizers), and inventive images according to the invention, which can, if desired, be further processed (e.g., using additive and/or subtractive processes such as those described herein). Light emitted from an inventive image and light hitting an inventive image can be modified in a many ways, e.g., using coloration, marking, attachments, filters, lenses, subtractive processes, etc.

In various embodiments, conductive polymer can be used to make inventive images using spin casting, and/or printing processes (e.g., ink jet printing processes, lithography, photolithography, soft lithography, high resolution optical lithography, silk screen, block printing, etchings, monotypes, etc.). Such processes are stabilizers. In other embodiments, conductive polymer is used in inventive images in melt and/or in solution processing techniques, by blade coating, and/or by evaporation of low molecular weight dyes. For example, polymer (100 nm) might be added onto an image support by spin coating of a solution. As other examples, conductive polymer might be used in inventive images with processes such as: blow molding, calendering, fiber spinning, compression molding, extrusion, coating processes, spraying processes, solution spinning processes (e.g., fibers), casting processes, coating processes, painting, drawing, writing, rolling processes, and/or gel processes.

In embodiments, conductive polymer is used in inventive images in blends. For example, a conductive polymer such as one based on polyaniline (like those made by Panipol Ltd of Porvoo, Finland), might be blended with one or more other polymers, such as polyethylene, polypropylene, polystyrene, PVC, poly (methylmethacrylate), phenol-formaldehyde, epoxies, melaminefomraldehyde resins, thermoplastic elastomers, etc.

It is important to note that the use of conductive polymers in making inventive images is not restricted in any way by the limitations which typically exist in the conventional use of conductive polymers for other purposes. Therefore, inventive images can be made using conventional or non-conventional practices for using conductive polymer such as those described herein. As an example, conductive polymers are conventionally used in extremely thin layers, even layers, homogeneous layers, typically on image supports that are rectilinear, geometric, smooth, and/or even. Conductive polymers can be used in these ways in inventive images, as desired. Since conductive polymers have no limitations when used in making inventive images, they can be used in a variety of other ways, including unevenly, irregularly, discontinuously, in any thickness desired, in layers that are heterogeneous, in any number of layers with or without other ingredients, or in a combination of these ways, on image supports and/or on other image surfaces of any description, that comprise one or more internal and/or external parts of an inventive image or that comprise all of it, with or without other aesthetic effects or further processing, such as any described herein or known to those of ordinary skill in the art.

In various embodiments, one or more electrodes, parts, layers, batteries and/or other devices (stabilizers) can be added to an inventive image for its use and/or supply of energy to a conductive polymer, e.g., enabling its conductive polymer to emit visible light. As an example, an inventive image is made with one or more layers of conductive polymer (e.g., thin layers) between two electrodes which are stabilizers (e.g., additional layers, preferably thin). It is preferable for each of these layers to be transparent or translucent, however it is often preferable for one of the electrodes to be opaque, e.g., a reflective cathode. For example, one electrode may be indium tin oxide (ITO) and the other might be calcium (Ca), which might be evaporated on in a thin layer. Between these electrodes there might be one or more conductive polymers, (e.g., in layers), such as poly-fluorene and/or poly(ethylenedioxythiophene) (PEDOT). Such inventive image compositions may or may not be formed and/or superimposed on an image support (e.g., stabilizer) made of polymer and/or non polymeric ingredients, e.g., a polymer (such as polyester or heat stabilized polyester), glass or paper image support. This inventive image composition might for instance, be a layer of conductive polymer in between an anode and a cathode (e.g., metal or metallic), for example, in a composition made of at least three superimposed layers, or perhaps even on a fourth substrate layer. When voltage is applied, such as by the use of wires and a battery (stabilizers), positive charge carriers move into the anode (a stabilizer) and negative charge carriers move into the cathode (a stabilizer). Both positive and negative charge carriers migrate into the conductive polymer. They approach each other, combine, and generate an excited state (e.g., neutral), which decays and generates visible light. This might for example, occur many times a second. For example, on each cm of such a layered light emitting polymer composition running at standard brightness, this may happen about 1,000,000,000,000,000 ($10^{15}$) times a second. The specific rate is not critical, and will depend on various factors including the type of material, such that the rate can be altered by one of ordinary skill in the art through routine experimentation. It is preferable to encapsulate polymer LEDs or parts thereof against the ingress of water and oxygen, e.g., using glass and/or polymer, such as epoxy.

In other embodiments, a polymer light emitting device can be made using two superimposed layers of conductive polymer between its anode and cathode. Such a device might, for example, have an anode (e.g., ITO) on a glass or polymer image support, or other inventive image surface. Then it might have two conductive polymer layers (preferably thin or extremely thin). One could be a polymer hole conducting layer, e.g., polyethylene dioxythiophene polystyrene sulphonate (PEDT/PSS) made by Bayer AG of Pittsburgh, Pa. and Krefeld, Germany, for instance, deposited from aqueous solution to form a thin film. The second conductive polymer layer is a conjugated polymer emissive layer (EL), (e.g., such as polyarylene systems, or a polyfluorene), for example, deposited from an organic solution. Then the LED might have a cathode system, e.g., deposited by physical vapor deposition, which might include a low work function metal, for instance, capped with aluminum. It is preferable to then encapsulate the device to inhibit or prevent the inward migration of oxygen, water, or both.

Conductive polymer, such as in the form of polymer LEDs, can be made to emit light in any color or in multiple colors, the brightness of which can be very low, very high or anywhere in between (e.g., as bright as a television screen or brighter), with only a small power source (such as a battery or current from an outlet), and if desired, at a low operating voltage (e.g., about 2 to 6 volts). Such a polymer LED may be an unfinished or a finished inventive image. It may, for example, be superimposed by additional layers of cPRM, polymer or colorants, it may have other light effects, etc., as desired.

Among the valuable properties in the use of conductive polymer to produce light in inventive images (such as in the form of polymer LEDs), are the relatively low power required compared to conventional electrical components such as neon, and the lack of significant heat produced by the emission of light, even over long periods of time. Less power is required than other light sources which might be and have been used in images, which can lead to longer life of the light source. The power source can be any suitable source, but is preferably DC power. In addition or instead, this may facilitate hiding a power source (such as a battery or solar cell) and/or associated materials (such as wires or conduits) from view, and/or facilitate working the visibility of the power source and/or associated materials into the design or aesthetic composition, if desired. The reduced heat output of the light source is typically highly desirable for the stability and permanence of many inventive images, such as images which have conventional image making mediums and materials (e.g., oil paints, colorants containing wax, egg tempera, cellulose paper, photographic mediums, etc.), which can change undesirably with exposure to heat such as that produced by conventional light sources such as bulbs.

In one example, a polymer light emitting device is formed in an inventive image by surrounding a semi-conductive polymer asymmetrically with a hole-injecting electrode (e.g., ITO) on one side, and on the other side, a low work function, electron injecting metal contact (such as aluminum, magnesium or calcium). Radiative charge carrier recombination in the polymer results in the emission of light as electrons from one side and holes from the other recombine. As another illustration, a transparent or translucent polymer or glass image support (e.g., stabilizer, perhaps made of polyethylene-terephthalate also known as PET), might be superimposed by a transparent indium tin oxide (ITO) electrode. Using a spin coating process, a thin film of a semiconducting polymer is superimposed onto the ITO from a solution. Then, the second electrode is deposited onto the polymer using a vacuum evaporation of a metal (e.g., calcium), sputtering, or the like, or a combination thereof.

In another example, a layer of poly(dioxyethylene thienylene) doped with polystyrene sulphonic acid or polyaniline-chloride is used between a layer of indium-tin oxide and an emissive polymer layer. Another example shows the use of two different conductive polymers, (e.g., in superimposed layers), between the two electrodes in forming a polymer LED inventive image. One of these conductive polymers might, for example, be a conductive polymer precursor (e.g., heat-converted into its final form before deposition of the next layer), and the other might be the light emissive conductive polymer. For instance, a conducting polymer layer might be used between the emissive PPV and the ITO in a polymer LED image.

In a further example, a light emitting polymer (LEP) device used in an inventive image is made using an anode, such as ITO, preferably on a polymer image support (though it could be on a glass image support). This is superimposed by two layers of polymer, which are preferably thin or very thin. One is a polymer hole conducting layer, such as a film of polyethylene dioxythiophene polystyrene sulphonate (PEDT/PSS) (made by Bayer AG of Pittsburgh, Pa. and Germany), and deposited from an aqueous solution. The other is a conjugated polymer emissive layer. Then a cathode (or cathode system) is deposited, comprised of a low work function metal, typically capped with aluminum. Then, the device is preferably encapsulated. Another, more specific example of a polymer LED, which can be used in inventive images has ITO as the contact anode on a polymer or glass image support. Then, the hole injecting material is poly(3, 4-ethylene dioxythiophene)/poly(styrenesulphonate) (PEDOT:PSS) (from Bayer AG). The light emitting polymer layer can be polyfluorene, polyarylene or polyphenylenevinylene. The device has a low work function cathode material, such as Ca, and it is encapsulated with a lid.

Another example is a polymer LED made with a low work function stable alloy of aluminum as the cathode material, a high PL efficiency PPV precursor and an ITO protector layer. A further illustration provides a thin layer of a conducting polymer deposited (e.g., spin or blade coated) between and PPV copolymer. This central layer of conducting polymer might be polyethylene dioxythiophene/polystyrene sulphonate (PEDT/PSS). The cathode might be a sputtered low work function Al alloy.

In a further illustration, an inventive image has a polymer light emitting device made of one or more spin-cast, extruded and/or printed layers of polymer, on an image surface made of polymer or glass pre-treated with a transparent electrode material patterned (before the polymer is superimposed) to help define the device configuration. The other electrode can be deposited by vacuum metallization and patterned, and the device is sealed in a hermetic package. One or both of these electrodes might, for example, be in linear patterns.

The chemical structure of a polymer and its conductivity can be controlled, engineered, or designed to be appropriate for different aesthetic, utilitarian and other purposes in inventive images, e.g., by altering the polymer's molecular chains. For instance, the chemical structure of a light emitting polymer can be engineered to produce any or all emission colors. This light might be emitted from one or multiple parts, sides and/or surfaces of a single inventive image. As another example, using a solvent to alter the molecular chains of a polymer can change its conductivity, e.g., chloroform decreases conductivity, and m-Cresol increases conductivity, in varying polymers.

In inventive images, light emitted by any portion of the conductive polymer or by all of it, can be any color desired, i.e., one or more colors and/or colorless. Inventive images made with conductive polymers can have full color light emission, if desired, which can be extremely useful in making images, e.g., full color passive and active matrix display, such as created using direct patterning techniques. Moreover, the light emitted can change over time in any way desired. For example, over time, some or all of the light emitted by any portion of the conductive polymer (e.g., even a portion as small as a pixel), or by all of it can change (e.g., in brightness, in color, in direction, it can go on and off, or a combination of these, as desired). Conductive polymer offers fast response, or switching time, on and off. All of these elements can, if desired, be used to contribute to the inventive image's aesthetic, and/or if desired for other purposes, e.g., to give the image an interactive or utilitarian element. Such an inventive image might for example, have a computer as part of it or it might function like a computer screen. Thus, it might have a screen, a computer chip, a viewer input device to control the image (such as a drawing device, trackball, a button, a mouse, voice command, or switch), an optional audio component (e.g., producing sound and/or responding to sound such as to the viewer), or a combination thereof. The inventive image might also present a moving image (e.g., realistic and/or abstract), such as a film or video image or image part, which might be controlled and/or altered by a viewer controlled input device. Viewed from any angle or from multiple angles, the same light, color or image projected by a polymer LED can be seen. In comparison to liquid crystal displays, polymer LEDs do not have to be viewed straight on for the light, color and/or image they display to be seen, and they do not have to be backlit. Polymer LEDs offer high brightness at a wide viewing angle. Organic LEDs are compatible with standard silicon driving circuitry, which may be used as desired in inventive images.

Conductive polymer can be applied onto an image support very thinly (or in any other thickness desired), in layers, in designs, drawings, patterns and/or compositions which can be as controlled and as precise as desired, even if they are complex, intricate, and/or light emitting (e.g., light intensity is proportional to current). For instance, conductive polymer can be applied onto an image support or other image surface in pixels, e.g., using an ink jet printing process. For example, each pixel may be comprised of multiple sub-pixels (e.g., in layers), each of which might for example, be capable of emitting one color, e.g., three sub-pixels, one can emit red, one can emit green, and one can emit blue light. Using conductive polymers, any pixel shape or size is possible and very high resolution can be achieved. Moreover, light emitted by a conductive polymer can have any level of brightness or contrast, even very high brightness and contrast, and switch at any desired speed. Note that although typically pixels are extremely small, in inventive images they may be any size, e.g., from extremely small to large. Pixels may or may not be visibly apparent in actual inventive images.

Like other polymers of the present invention, conductive polymers can be applied to an image support or other inventive image surface using one or more painting and/or printing processes. Ink jet processes are among those preferred for making inventive images of conductive polymers, both charge conducting and emissive polymer layers, and for other polymers. Examples are ink jet practices specially developed for handling conductive polymers, e.g., by Seiko Epson and Cambridge Display Technologies, or by Philips Research of Eindhoven, The Netherlands. Such processes can be used according to the invention to apply conductive polymer in one or multiple layers, on part or all of any size image support, or one or more other inventive image surfaces. Ink jet printing conductive polymer can be done with the level of precision and resolution desired, it can even be done with great precision and a high resolution, e.g., using LEP inks based on poly(dialkylfluorene) derivatives chosen for high luminescent efficiency in blue, green and red.

Specific examples of the use conductive polymers in inventive images will become more sophisticated as the technology is further developed for utilitarian applications in products which are not images, e.g., such as for phone displays, interne appliance displays, utilitarian computer monitors having higher resolution and more sophisticated pixels, instrument panels, docks, television screens, privacy glass, "smart" windows, batteries, solar panels, cameras, sensors, transparent coatings, fibers such as fabrics, transistors, capacitors, photovoltaics, conductive adhesives, computer memory and hard disks, circuits, photodiodes, lasers, and the like.

In an illustration, a 2.5 inch full color, 16 gray level active matrix display can be made (e.g., with materials from Cambridge Display Technology) that has 200×150 pixels each comprising 9 sub-pixels, 3 per color. Such a display might offer 16 gray levels per color, based on low temperature, polysilicon active matrix technology, using a digital drive scheme, and temporal and spatial dither. Its structure may, for example, have a common cathode efficiently injecting electrons into the lowest unoccupied molecular orbital of the three polymer emitters (i.e., like a conduction band in inorganic semiconductors).

In another example, the source-drain and gate electrodes might be comprised of a water-based ink made of one or more conducting polymers, such as poly(3,4-ethylenedioxythiophene) doped with polystyrene sulfonic acid (PEDOT/PSS, Baytron P from Bayer, Krefeld, Germany). In yet a further example, the active semiconducting polymer might be poly(9,9-dioctylfluorene-co-bithiophene) (F8T2), for example, used in a xylene solution which might be applied by spin coating. Photolithographic processes may also be used to pattern layers of polymer LEDs, such as those processes used by Philips. A further illustration provides the formation of a dot matrix screen made from a thin film of light emitting polymer on a glass or polymer image support, coated with a transparent ITO electrode, with an aluminum electrode evaporated on top of the polymer. Such a design might have the electrodes patterned in orthogonal rows and columns. When current is applied, the area at the intersection of these lines emits light.

In the use of ink jet processes with PRM, cPRM, and/or polymers, a number of variables can be used and/or controlled as desired, e.g., for aesthetic effects as well as practical ones. Different ink jet processes, different PRM, cPRM, polymer, and/or image surfaces might be desired for different purposes. For example, among these variables are the ingredients used in a polymer ink (e.g., the viscosity of the PRM, cPRM or polymer, how it dries, if it bleeds or beads up, etc.), the effect of any ingredients in the ink on the ink jet printer itself (e.g., a solvent dissolving the print head), the ability of the print head to deposit the ink in the manner desired (e.g., for both aesthetic and practical purposes, such as to inhibit ink clogging of the print head nozzle, and in a way so that the print head deposits the ink as desired), the interaction between the ink deposited and the image surface it is deposited upon, and the like. Ink jet processes for conventional polymer LED displays, which typically strive for qualities like precision, control, high resolution, and perfect registration, can be used as desired in making inventive image. The use of ink jet processes for making inventive images, however, does not have the same kinds of limitations, and one of ordinary skill in the art can envision a wide array of applications in accord with the invention herein.

Conductive polymers or polymer LEDs may be formed into inventive images and/or onto inventive images or image supports that are even, regular, flat, planar, rectilinear, geometric, and/or exact, but they are not restricted to such kinds of forms. Conductive polymers and polymer LEDs are formable using a variety of processes in any way, shape or form desired, on inventive images or image supports and/or into inventive images of all descriptions, such as those that are irregularly shaped, uneven, non planar, not flat, discontinuous, in shapes or forms which are not rectilinear and/or non-geometric. Conductive polymer and/or a polymer LED might be used (e.g., disposed) on an image support that is carved, incised, embossed, textured, undulating, angled, rigid, flexible, foldable, discontinuous, or a combination of these, as desired.

It is generally preferred that conductive polymer used in inventive images be stable and permanent, or as stable and as permanent as possible. Thus, it is often preferable that conductive polymer parts, layers, LEDs, other such devices, power sources for any of these, and associated materials are capable of being reworked, replaced, repaired and/or restored if they change over time in an undesirable manner (e.g., if their ability to function decreases or if they stop functioning), and/or if the technology advances in a way which is more desirable for the specific inventive image.

Inventive images made with conductive polymers (e.g., made with any of these devices, made electrically active, and/or made with any of these qualities) can of course be further processed, e.g., painted, incised, developed with additional parts, and/or layers, etc. Such devices and effects might also be added to inventive images which already are developed to any extent, e.g., a polymer LED added to an image support stabilizer that already has light effects such as those described herein, painting, carving, multiple layers, and/or non polymeric parts. Light emitted from an inventive image can be modified in many ways, e.g., using coloration, attachments, filters, lenses, subtractive processes, etc.

In addition to, or combination with, these polymers and/or blends, dopants, dyes, and/or complementary materials may be desirable. Examples of dopants include, but are not limited to, metal ions, e.g., Pt(II), Ir(III), etc.; non-metal ions; organic protic acids, e.g., phosphoric or sulfonic acids, such as p-toluenesulfonic acid, and mixtures thereof; and combinations thereof. Examples of dyes include, but are not limited to, low molecular weight and/or branched molecules, e.g., oligomeric polyphenylenevinylenes and/or polythiophenes, such as polythiophene octopus and spiro-6-PP, which are commercially available, e.g., from Covion Organic Semiconductors GmbH of Frankfurt, Germany. Charge transport materials and/or photo-sensitizers may also be added in an amount sufficient to improve the conductivity or light emissivity of the conductive polymers or light emitting materials.

Preferred conductive polymers are too numerous to mention here but they are recited in application Ser. No. 10/170,503 and are incorporated by reference herein.

In various embodiments, conductive polymer is used to create or enable one or more aesthetic elements in inventive images. For example, this conductive polymer may emit visible light, it may affect light transmission or the direction thereof, image color, movement, mobility, sound, form, structure, one or more other formal elements, or a combination of these. Such conductive polymer may, for example, be a transparent coating or layer on or in an inventive image.

In some embodiments, inventive images can be interactive. Conductive polymer may be used to create this interactivity, and/or it may be created by another means. Such inventive images might have computers, camera, control devices, microphones, recording devices, movable parts, changing light effects, changing colors, changing forms, projections, video, film, devices that play sound, printers, sensors, and the like, as desired.

In various embodiments, one or more formal elements of an inventive image or part(s) thereof is varied or changed, using energy such as electricity, heat, light, and/or magnetism. After the image is finished, this variance or change of one or more of an image's formal elements may or may not continue and/or be visible, e.g., the finished image may have changing or variable formal elements. Such effects might be created using conductive polymer, and/or one or more other mediums, materials and/or devices in inventive images. For example, exposure to electricity or voltage might cause or enable aesthetic and/or functional elements of an inventive image or part thereof to change or vary, such as its transparency, its translucency; other aspects of the manner in which it relates to light (e.g., the direction of its light or its reflectivity); the hue, the value, and/or the intensity of its color; its use of film, video and/or sound; any other interactive devices or features it may have, other formal elements and/or combinations of these. In another example, an image or a part thereof varies according to changes in the temperature around it, e.g., due to the use of crystal violet lactone, for example in a PRM and/or in a colorant that is in and/or on an image. Inventive images of these embodiments might be exposed to energy in any way desired, e.g., continuously or for controlled and/or uncontrolled time periods. The variance or change in the image might be controlled directly and/or indirectly or in any other manner. For example, it may be controlled by a switch or other device, with or without human initiation, such as a timer, a computer, a camera, or a sensor (e.g., responding to: a viewer's presence, sound, light, change in the environment, or a combination thereof). Such variance or change might be controlled by a viewer speaking, or pressing or touching part of the image, such as a button or a sensor. As an illustration, such variance or change might even be controlled from a distance, and/or regularly, e.g., an image's formal elements changed via wireless communication (or broadcast) and/or changed daily, weekly or monthly. Such effects can be desirable to use or control visible spatial depth and other formal elements in images of the invention. Such effects can also constitute or enhance interactivity in an inventive image. In other examples, an inventive image's form is changed using electricity, which may enable an inventive image or part thereof to be mobile. Electricity might run one or more devices in an inventive image, such as a camera, a printer, a screen, a display, a projector, a monitor, a computer, a fan, a light source, a recorder; a radio, a machine or player that emits sound (e.g., music), or the like.

In embodiments, a colorant, paint or ink is used in and/or on inventive images that can be varied and/or changed, as desired, using energy such as electricity. The change or variance in these images can be done in any manner and at any rate desired, e.g., changing part or all of an image very slowly, very fast or at any rate in between. Thus, for example, moving images, full motion images, video and film images can be made in various embodiments. (Refer to the prior descriptions of the fast response or switching time conductive polymers offer for use in inventive images, as well as their full range of emission colors, etc.)

In some embodiments, the colorant, paint or ink used in and/or on inventive images that can be varied and/or changed, as desired, using energy (such as electricity) is made using tiny microcapsules of transparent or translucent fluid (e.g., microcapsules of a polymer, each of which may be about the diameter of a human hair). In the inventive image, each microcapsule might be capable of functioning like a pixel. These microcapsules are placed between electrodes, at least one of which is at least partially transparent or translucent. Within each of these microcapsules there are suspended particles (e.g., pigment) of one or more colors, e.g., white and black; or white and red, blue, green and/or yellow. Each suspended particle either has a negative charge or a positive charge. A microcapsule might contain particles with a positive charge and/or particles with a negative charge, e.g., it is often preferable for a microcapsule to contain both. Suspended particles can move within their microcapsules, e.g., moving to the side of the microcapsule that is against one of the electrodes. So, when one electrode is negatively charged, it draws the positively charged particles to the part of the microcapsule that is against that electrode. If that negatively charged electrode is transparent or translucent, the color of the positively charged particles drawn to it, is visible at that spot on the inventive image. Likewise, when one electrode is positively charged, it draws negatively charged particles to the part of the microcapsule that is against that electrode. If that positively charged electrode is transparent or translucent, the color of the negatively charged particles drawn to it is visible at that spot on the inventive image. Thus, if a microcapsule that contains both positively and negatively charged particles is in between a negatively charged electrode and a positively charged electrode, the particles will position themselves in opposite areas of the microcapsule, against the oppositely charged electrodes. Thus, to the extent that one or both electrodes are transparent or translucent and to the extent that any other part of the inventive image which is against each electrode is transparent or translucent, the microcapsule with show a color on one or both sides of the image.

In various embodiments, electrochromic mirrors, coatings, and/or effects are used on or in inventive images. For example, such a mirror, coating or effect changes its surface and/or its use of light (for example darkening it) in response to an electrical charge, e.g., when a sensor detects the presence of bright light, the image darkens. Examples are electrochromic mirrors made by Gentex Corporation of Zeeland, Mich. Conductive polymers might be used in such inventive images. In some embodiments, inventive images or parts thereof function as electrochromic windows, "intelligent" windows, "smart" windows, and/or it enables them have these kinds of effects, whether or not these images function as transparent windows or not. Such images can vary, control, block, and/or reduce the amount of light, the color of the light and/or other properties of the light that can pass through them. Such effects may be created in inventive images using conductive polymers. Also, in certain embodiments, "switchable" mirrors, the effects of switchable mirrors and/or similar effects are used to make inventive images or parts thereof. For example, switchable mirrors, or the effects of them, can be used in inventive images, such as the switchable mirrors made by Philips Research in Eindhoven, The Netherlands. Inventive images of these embodiments might be made with conductive polymers. Examples of switchable mirrors can change from a reflective to a transparent state and back when voltage is applied and turned off. It is possible to modify this effect and create variations of it as desired in inventive images, e.g., for aesthetic purposes. In switchable mirror inventive images or parts thereof, made using the same technology as Philips or made with technology that is similar or related, a rare-earth metal is induced by exposure to hydrogen, to convert to its ionic hydride. The hydrogen can be transported into a transparent hydrogen storage electrode when energy (e.g., voltage) is applied and back when it is switched off. If desired, such features can be part of a system or a "smart" system of inventive images e.g., a system in which one or more aesthetic elements and/or functions of an image are controlled, varied, and/or changed over time. For example, such features can be part of a smart system that varies or effects the properties of light that pass through the image or part thereof, e.g., varying or effecting the amount of light, the path of light beams, the color of light, and/or its other properties in the inventive image.

The inventive images herein are not limited by the restraints which conventionally determine the designs of items made using the conventional practices described in the paragraphs above and in other conventional practices, because inventive images need not serve the same utilitarian functions. This leads to a wide array of aesthetic possibilities. For example, a mirror, a window or an effect like that in a conventional mirror or window, which is part of an inventive image, need not be smooth, even, consistent, or planar, and need not have the same light properties as a conventional mirror or window, e.g., it may have distortions, any other irregularities desired, as well as further processing such a superimposed layers. In making inventive images, conventional practices such as those described in the paragraph above, can be used in any manner desired. Various conventional chemicals, processes, and the like can be used to make the inventive images of the invention, as will be readily determined by those of ordinary skill in the art.

In certain embodiments, suspended particle devices are used in inventive images, e.g., in between layers. In these devices, the random positioning of particles suspended in a material, liquid or film inventive image layer and/or part inhibits or prevents light from passing through until an electrical charge causes these suspended particles to align or position differently, thereby modifying the amount of light passing through the inventive image layer and/or part, which has increased or decreased transparency or translucency than before the electrical charge. The use of such suspended particles might create a filter in an inventive image that changes over time, (e.g., quickly), as desired, e.g., controlled by a switch, a timer device, a viewer-controlled device, or the like. Mirrors or mirrored surfaces in inventive images might also have layers or parts with these kinds of suspended particles. The suspended particles in such layers and parts of inventive images might for example be liquid crystal, including liquid crystal dispersed (e.g., droplets) in a layer or matrix of polymer (which is preferably transparent or translucent, and typically thin, e.g., a conductive polymer), in an inventive image, sandwiched between two conductive layers and/or electrodes (which are preferably transparent or translucent and typically thin also, e.g., layers of ITO). Moreover, the entire layered form might then be superimposed on one or both sides by a polymer (like polyester) and/or by glass. Such technology is currently used in cars, windows and privacy glass.

As an alternate example, the polymer layer or film with the dispersed liquid crystals might be sandwiched between layers of polyvinyl butyral (PVB), then, if desired, glass might be superimposed on one or both sides. Alternately or additively, glass coated with PVB might be superimposed on one or both sides of the polymer layer or film with the dispersed liquid crystals. For instance, a conductive layer comprised of polymer with suspended particles such as dispersed liquid crystals, is sandwiched in between electrodes (e.g., ITO). Then, this is preferably sealed or encapsulated to inhibit or prevent the ingress of water, oxygen, or both. For example, it might be superimposed by polyester on one or both sides. In addition, or instead, PVB and/or glass are superimposed, e.g., as separate layers.

In other embodiments, a liquid crystal display, optionally illuminated, is used in an inventive image. Typically, electronic practices (e.g., electricity and electronic processes) are used in inventive images with liquid crystals.

In certain embodiments, polymer in an inventive image serves as insulation for one or more other parts thereof, e.g., it is insulation for a conductive polymer in the same inventive image.

Further Processes of Creation—Workability—Adding and Subtracting Matter

The medium of the present invention typically offers full and free workability, reworkability and controllability which does not diminish during or after formation of the image. Processes for working with the medium typically can be reworked and controlled, e.g., reversed or changed. This creative freedom and aesthetic control can be a substantial advantage which many conventional practices do not offer.

Additive and/or subtractive processes can typically be used to make and/or rework inventive images, one or more times, at one or more stages in the image's formation or anytime thereafter, as desired. In various embodiments, more cPRM, polymer and/or one or more other ingredients are added to an inventive image, (e.g., to its polymer). In various embodiments, cPRM, polymer and/or one or more other ingredients are subtracted from an inventive image, e.g., by cutting, sanding, sandblasting, other abrading processes, carving, engraving, cutting, chiseling, incising, and/or by breaking it, using any of a wide variety of tools, and/or by hand. The addition and/or subtraction of polymer and/or other ingredients typically offers unprecedented workability, reworkability and controllability in making inventive images and it can create and/or affect one or more formal elements of an image. Those of ordinary skill in the art will be able to envision many other suitable additive and/or subtractive processes for use in working the medium of the invention.

Compositional Arrangement

The compositional arrangement of inventive images are unlimited and typically workable, reworkable and controllable as desired. Using the present invention, a compositional arrangement can be made, and then if desired, it typically can be further worked, reworked and controlled as desired, repeatedly if desired, over any period of time, e.g., typically in a WYSIWYG process, in a sight unseen process, in a preplanned process, in a spontaneous process, or in a process that combines these. The compositional arrangement which can be formed using just cPRM and one color are infinite. The use of compositional arrangement can bring real light and real spatial depth into images as never before, and affect other formal elements typically without lessening the inventive image's strength, its permanence, or its other desired elements undesirably.

When considering compositional arrangements, one or more parts of images can be rearranged, adjusted, or modified; painted, carved, cut or enlarged; removed or minimized; developed, integrated, and unified with other parts, with other formal elements, and in their relationships to the image as a whole. By making images in parts, their compositional arrangements, forms, and structures can be made as desired in a myriad of variations, using real space, in addition to or instead of other forms of space. The ability to create in parts using the inventive medium image offers freedom, aesthetic possibilities and control, which was heretofore limited or non-existent. The Figs. show a variety of examples of inventive images made in different compositional arrangements, many of which are images made in multiple parts such as the images shown in FIGS. 65-67 and 79.

Further Creation Processes

Inventive images can be formed in any process or processes desired, as will be readily understood by those of ordinary skill in the art. In an example, inventive images or part thereof are made which are positive cut-outs, but these can be rigid, flexible or both; transparent, and/or translucent; they can have internal designs and coloration; they can emit light or have light effects; texture, etc. See FIG. 4. For instance, (a) polymer can be cut into the desired shape to make a cut-out, (b) a cut-out can be cast in polymer, (c) a cut-out can be made by connecting multiple parts, (d) a cut-out can be made by partially or completely covering, backing or encasing one or more forms with cPRM and/or with polymer (such as covering, backing or encasing materials, devices, found objects, or image supports, e.g., paper forms or forms made of the inventive medium), and/or (e) a cut-out is formed by hand (with or without tools) using a malleable polymer, or (f) a combination thereof.

Polymerization and Image Making Polymers of the present invention may have linear chains, and/or may be cross-linked. Materials used in forming polymer of the present invention typically include one or more polymerizable monomers, and one or more initiators or catalysts which are appropriate for polymerizing the specific monomer or monomers, preferably mixed together. For example, a cPRM for the present invention might be comprised of only one monomer and its initiator or catalyst. However, multiple monomers (preferably mixed), pre-polymers, polymers, multiple initiators and/or catalysts (preferably mixed), or combinations of these can be used to form polymer, as desired. Should any of the monomers require a specific catalyst, it is preferable to add that catalyst into the mixture. In forming many inventive images, the monomer, or at least one of the monomers, used is capable of forming polymer that is preferably transparent or translucent, has desired optical properties (such as a particular refractive index and/or light transmittance), has other desirable aesthetic properties, is strong in a manner which enables the image to be permanent, can be further processed as desired, or a combination of these. In particular, preferred monomers include esters, urethane-forming components, acrylics, ethylene-forming monomers, monomers that form conductive or absorbent polymers, or any other suitable monomer. Preferably, the PRM forms polymer with desired aesthetic properties or so that it enables desired aesthetic properties in the image.

Inventive images or part thereof, are one or more sun prints, photograms, negative photographic prints, positive photographic prints, negative photographic transparencies, positive photographic transparencies, holograms, or as combinations of these, as desired. These can be transparent, translucent, opaque, partially opaque, or combinations of these, and they can be further processed as desired. For instance, inventive images or part thereof might be transparent photographic transparencies made on polymer that is transparent, translucent, opaque, partially opaque, or a combination of these, e.g., portraits landscapes, abstractions, photographs of conventional images, etc. If desired, these photographs may be altered as desired in a computer program before they are part of an inventive image. As an illustration, a conventional photograph on conventional photographic paper might be bonded to the flat backside of an inventive image using any singular or multiple methods, means and manners desired, for viewing through its other sides, any and all of which might be painted, carved, flat, undulating, perforated, textured, inlaid, printed upon, written upon, designed with one or more photographs on them, with embedding, designed in one or more other ways, or a combination of these. In a further illustration, one or more photographic transparencies are made or transferred onto the backside or the underside of transparent or translucent polymer in making an inventive image.

It is sometimes desirable to cover photographic emulsions on external surfaces of inventive images with a material that protects them from undesirable changes. For example, a photographic emulsion can be coated with a stabilizer, a material or a medium, that protects it from UV light, e.g., cPRM with a UV stabilizer in it, or a standard protective spray available in a photographic or art supply store that might, for instance, be an acrylic spray containing a substance that absorbs UV light. For example, the polyacrylic spray described above can be applied on a photographic emulsion on an inventive image, preferably in more than one layer, letting each layer dry before applying the next layer. Care and precaution to avoid or to prevent undesirable changes to a photographic emulsion on an inventive image are often desirable prior to superimposing it with anything. A photographic emulsion on an inventive image might, for example, be superimposed by: cPRM, polymeric or non-polymeric ingredients.

The present invention expands the use of photographs, transparencies, parts thereof, and combinations of these in images far beyond its prior boundaries, e.g., with a wide variety of qualities and effects that are not available in conventional practices, such as: real variable spatial depth; real variable light; light effects; layered effects, etc.

In an embodiment, one or more holograms are part of an inventive image or part thereof, e.g., in or on the image. For example, a hologram can be attached to an inventive image, inlaid in it, embedded in it, or it can be a part of an inventive image that is not physically attached to it but which is visible through its transparent polymer or glass. For instance, holograms made by DuPont Displays in Logan Utah may be used in inventive images. In a further embodiment, one or more conventional images or part thereof that are stereoscopic, autostereoscopic, lenticular, computer generated, or a combination of these are part of an inventive image.

In an embodiment one or more solar panels are used in inventive images. The energy captured by such solar panels may be used as desired. For example, solar panels on an inventive image might provide the energy for conductive polymer(s), for one or more lights illuminating that inventive image, they might provide energy to run sound, video or a computer equipment on the same image, they might provide the energy to run a motor or a fan on the same image, (e.g., on a mobile or kinetic sculpture) or a combination of these.

Further Description of the Methods, Means, and Manners in which Inventive Images are Set-up, Presented, Installed, Displayed, and Exhibited Inventive images can be set-up, presented, installed, displayed, exhibited, or used in combinations of these ways, using any conventional, or any novel method, processes, means, manner, materials, media, objects, devices, or their combinations of these as desired. In some embodiments, inventive images are set-up presented, installed, displayed, exhibited, or prepared for viewing with specially designed mounts. Inventive images might be set up for viewing using mount systems designed to enhance their notable aesthetic elements, such as their transparent or translucent spatial depth and their use of light, often in combination with their use of color and/or other elements. It is often desirable to display transparent and translucent, inventive images so that the view through the image and the light on the image are aesthetically desirable, e.g., the inventive images is displayed, at a distance determined by the image maker in front of a reflective surface like a white wall. Inventive images can be displayed using one or more parts that may or may not be image parts, e.g., such as a conventional base, pedestal, frame, or mat that are not part of the inventive image. Parts of inventive images that enable them to function (such as electrical wires, transformers, and components for light sources) may be visible to viewers, hidden from view or both.

In an embodiment, inventive images are set-up, presented, installed, displayed, exhibited, or used in a manner which is interactive with one or more viewers. For example, an image might be set-up so that viewers have to walk through it, or into it in order to see it. The relationship between the space (or environment or site) in which an image exists, and the way in which that it is set-up, presented, installed, displayed, or exhibited, in that space can affect that inventive image enormously. If desired, image makers can control and use this relationship, as desired, to affect an inventive image in myriad of ways ranging from slight to major, as desired. For example, viewers may have to rotate an inventive image, turn a lever, the inventive image may have an interactive computer, or the physical presence of viewers may interrupt a signal sent off by an inventive image that may respond to this interruption. The interaction of an inventive image or part thereof with one or more viewers can form, alter or control effects in an inventive image. For example, a sensor in an inventive image might detect a viewer's presence and change the light of the inventive image accordingly. For example, an inventive image might require viewer participation, e.g., the viewer might have to touch or step on a sensor for the inventive image's light to change, the viewer might have to activate a key or a button to show a light effect in an inventive image (such as pushing a computer key), or the viewer might have to push or rotate a part of the inventive image to cause its light effect, etc. As a more specific illustration, by pushing a part of an inventive image that has negative cut-outs within its positive form, that part of the inventive image rotates and the pattern of light and shadow it makes on the floor or the wall changes as it rotates.

As an illustration, inventive images can be made that interact with viewers in the same way or similar to the way of Robert Rauschenberg's *Soundings* 2, 1968 v. 2 that is 96×432×54 and composed of three rows or layers, each with nine acrylic panels. Sensors within Soundings 2, cause different levels of illumination in response to different sounds from viewers in a darkened exhibition space. The visibility of silkscreened prints of chairs on Soundings 2's three layers of acrylic panels is determined by how much of Soundings 2 is illuminated. Similarly the light effects of inventive images can be determined by the sounds of viewers. As another illustration, an inventive image can be made that interact with viewers in the same way as Rauschenberg's Solstice, 1968 with four superimposed layers of transparent acrylic doors each of which has a different Compositional Arrangement of colored silkscreen prints on it. Each layer of these doors automatically opens for viewers to enter the artwork and seeing it from multiple points of view. See-through inventive images and interactive inventive images can be made with many more variations of effects of light and color than these artworks by Rauschenberg. With or without the use of these enhanced effects, inventive images can be made which open up for viewers to walk into and see from multiple vantages.

Some examples of ways that 2D or 3D inventive images might be set up for display are shown in FIG. 73. Note that though these inventive images are almost all simple forms (e.g., rectangular), the forms of inventive images such as those using these methods of display are not restricted to such simple forms.

FIG. 73. a.-l. shows inventive images that might for example be freestanding, some of these might have attached bases. These inventive images, others that are freestanding, large inventive images, and inventive images that are a combination of these, might for example be weighted so that their upper portions are light in comparison to their lower portions (e.g., their upper portions might be hollow, thinner than their lower part, or made of a composition that is lighter than their lower part).

FIG. 73. m, shows a freestanding inventive image that is supported by leg-like parts or braces on its sides. As the dotted line around the perimeter of the inventive image indicates, these supporting parts may or may not be part of a frame around this inventive image, e.g., for support.

FIG. 73. n. shows an inventive image that also has leg-like parts or braces, but these are secured in the floor, the ground, or into another base or structure for support. As the dotted line around the inventive image's perimeter indicates, these supporting parts may or may not be part of a frame around this inventive image, e.g., for support.

FIG. 73. o, is an inventive image that extends down into a structure below for support, e.g., into the ground, a base, or a floor. As the dotted line around the perimeter of the inventive image indicates, this inventive image might have a frame on its right and left sides, e.g., for support.

FIG. 73. p. shows an inventive image that is held up by vertical supports on its right and left sides that go to from this image to a structure beneath it, and from this image to a structural support above (though one or both of these vertical supports may or may not run the length of the inventive image). For example, these may be rigid or taught flexible rods, bars, poles, wires, or cords (e.g., polymer, metal or wood vertical supports).

FIG. 73 q. shows an inventive image that rests on a structure below (e.g., the floor, the ground or a base) and is held at both of its upper sides by flexible or rigid mount parts (e.g., wire, cords, rods, bars, etc.) to a structure above it (e.g., a ceiling, beam, rod, archway, etc.).

FIG. 73 r. shows an inventive image that is secured to both the structures above and below.

FIG. 73 s. shows a 2D or 3D inventive image held by a vertical support off of its vertical center, e.g., this support might be an attached rod, beam, bar, column, or another such vertical structure, for instance, made of polymer, steel, wood, taughtly secured wire or cord, or a combination of these, etc.

The twelve 2D or 3D inventive images in FIG. 7 are a few examples of ways that inventive images can be strengthened or reinforced using layers or parts (e.g., strengthening stabilizers shown in gray in each image) that are on or in their polymer (shown in white). These colors are for clarity in understanding this illustration and do not necessarily indicate coloration in these images. These strengthening layers or parts may enable these images to be displayed in the manner desired, e.g., by strengthening, supporting, or enhancing the support of the weak or less strong, flexible, fragile, delicate, brittle, gelatinous, or somewhat gelatinous polymer that comprises most or all of the rest of these images. The polymer part of each image that is strengthened by the added layer or part might be 2D or 3D, and transparent, translucent, or opaque, and the same description applies to the strengthening layer or part. The images in FIG. 7. may or may not have additional aesthetic elements that are not illustrated (such as coloration, incising, other compositional elements, air pockets, etc.). The strengthening layers or parts on these images (shown in gray) might be polymeric, or non-polymeric, e.g., they might be comprised of a cross linked polymer, a rigid polymer, another strong polymer, wood, or metal. In each of these inventive images in FIGS. 7.I.-XIII., the strengthening layer or part (shown in gray) might be within, underneath, or over part or all of their polymer layer (shown in white). Also, the strengthening layer or part in the images of FIGS. 7.I. and II. might be attached to the edge around the perimeter of each of these images, e.g., like conventional frames or mats.

The inventive images in FIGS. 7.III. and IV. each have ribs or struts that function as a strengthening layer or part. FIGS. 7. V.-IX. show other variations, the design of which, as in the other images in FIG. 7., may contribute to the strength, stability, permanence, or ability of these images to be displayed, and also to their aesthetic, provided both the polymer layer and the added strengthening layer or part are visible when the image is displayed. The polymer layer or part of the inventive images shown in white in FIGS. 7. I., II., V., IX., and X-XIII., might for example, be flexible. In the images in FIGS. 7.X. XIII., this flexible polymer might even be rolled or folded up (e.g., like a scroll) on their other strengthening part (shown in gray) that might be rigid. Also, the strengthening layer or part may enable the images illustrated in FIGS. 7. I., I., IV., and IX. to be self-supporting or free standing. This is also true of the images in FIGS. 7. X.-XIII. if their strengthening layer or part is larger than their other layer or parts made of polymer.

Another example is shown in FIG. 20 where the inventive image might have a strengthening layer (for example an image support shown darkly colored, e.g., a dark red transparent polymer, a reflective metal or mirrored layer, etc.) encased in polymer (shown in white). Also, FIGS. 71.II. and 72 both may show inventive images with strengthening layers that have the same width and length as the polymer layers they are upon. In FIG. 71.II. this strengthening layer may be another layer of a polymer that is different from and stronger than this image's initial polymer layer, e.g., a polymer that is cross-linked or rigid. In FIG. 72, this strengthening layer is a fiber added to the image's polymer image support in FIG. 72.II.

FIG. 79 shows side views of examples of the wide variety of different ways inventive images can be made and hung, installed, or mounted for display. These images might be any size, and they might be installed at any height. The fine, straight, vertical lines in FIG. 79. represent walls on which many of these images are displayed. The horizontal line in the center of each page of FIG. 79, may indicate a floor, ground, another base, structure, or a ceiling. The images in FIG. 79 might be mounted or installed using conventional practices, or using individualized variations of them.

FIG. 79 I. shows a concave image (e.g., that may function as a large lens) mounted out from a wall. FIG. 79 II. shows an inventive image made of three parallel polymer planes which might have different thicknesses, and which might be freestanding, e.g., it might be a painting, a sculpture, a wall, or even a screen. This image (and others made of multiple parallel planes) might take advantage of the transparency and translucency of the inventive medium. For example, the viewer might see this image as a composite of the aesthetic elements on several or on all of its six exposed surfaces or within its three planar polymer forms, e.g., as a painting made many layers each of which may have any of the aesthetic effects described herein. Among the other inventive images in FIG. 79 made of superimposed planes that might also be seen as a composite view of aesthetic elements at multiple, different real spatial depths using negative space, are the inventive images shown in III., V.-IX., and to some extent XII., XV-XVI. The images in FIGS. 79. III.-V. are constructions that might also be enhanced by the novel aesthetic variations that can be created using this invention. The image in FIG. 79. V might be placed on the floor using its mount parts as legs (with the side of the image shown on the left in the illustration on the floor) and reworked into an image that also functions as a table. The images in FIGS. 79. VI. and VIII. might function as paintings or as screens or walls. The image in FIGS. 79. IX. might use the plane of its form that is flush against the wall as a surface that contributes to the image aesthetically and is visible though the polymer of the image's other vertical plane, e.g., this plane against the wall might have coloration on it, it might be reflective, or it may emit light. In comparison, the images shown in FIGS. 79. XV., XVII., and XIX., that are mounted out from the wall without a planar part flush against the wall, might be enhanced by light reflecting off of the white walls behind them. The images in FIGS. 79. X. and XII. might also be enhanced by light reflecting through them from the walls they are fleshly mounted against. Any or all of the images shown in FIG. 79. might emit light using conductive polymer(s), e.g., using polymer LED(s) in or on their polymer forms. Thus, in addition to their aesthetic function, one or more of these inventive images might be a light source.

In embodiments, a sealer, a coating, a varnish or a similar protectant is used on part or all of an inventive image. Such a surface layer might enhance the image's permanence, or it might contribute to the image aesthetically, e.g., evening out the surface and providing a surface light effect.

In an embodiment a new unique rigid mount system is made and used for setting up, presenting, installing, displaying or exhibiting inventive images. In another embodiment a new unique wire mount system is made and used for these same purposes. In a further embodiment, a new unique mount system is made with a design that is a combination of the rigid mount system and the wire mount system. These specially designed mounts are stabilizers. Use of one or more of these mount systems can create a wide variety of set-ups, presentations, installations, displays, exhibitions, or other modes of viewing inventive images that are structurally and aesthetically effective, and that can be new and unique. For example, with or without any other method, means, or manner for their set-up, presentation, display, installation or exhibition, any of these mount systems or a combination of them can affect inventive images structurally, aesthetically, functionally, or have a combination of these effects, to any extent desired and in any manner desired, ranging from a critical effect to no noticeable effect at all, as desired. All of these mount systems are typically workable, reworkable, and controllable as desired. For example, they can be adjusted without removing them or they can be removed, and then if desired, replaced, altered, repositioned, etc. For example, their aesthetic can be shaped as desired because their basic forms and structures are so minimal and simple. Used with inventive images, any or all of these mount systems can be hidden from view or visible as desired. It is preferred that the visibility of each of these mount systems be aesthetically desirable, or it is preferred that these mounts systems be hidden from view, e.g., by the opacity of the part of the inventive image between the mount system and viewers.

The aforementioned rigid and wire mount systems, and mount systems that are combinations of these, are comprised of one or more mounts, each of which has the same basic, three-component design. Component (A) is an anchoring mount component to securely hold the inventive image onto the mount. It is embedded or inlaid in, attached to, or placed against the inventive image as desired. Component (B) is an adjustable middle, mount component that holds and fixes the inventive image at the desired distance from the structure from which it is mounted (e.g., from a wall or ceiling), while typically leaving the space in between the inventive image and the structure from which it is mounted, adjustable as desired, controllable as desired, and often workable and reworkable as desired. These adjustable mount components may also absorb shocks to the inventive image that might otherwise cause its polymer and perhaps other parts to crack undesirably or incur other undesirable changes. Component (C) is a mount component on the structure from which the inventive image is mounted, that connects to the inventive image's aforementioned middle mount component. The basic, minimal forms of all three components of the mounts comprising rigid mount systems, wire mount systems and mount systems that are a combinations of both of these, are intended to facilitate the creation of innumerable, diverse, individualized variations, as desired. For instance, the basic forms of all three mount components for all three of these mount systems can be formed, sized, shaped, embellished, and finished individually in a myriad of variations, as desired, e.g., for structural needs, aesthetics, or for other functions, as desired. A single inventive image can be set-up, presented, installed, displayed, exhibited or prepared for viewing in a combination of these ways, using one or more rigid mounts, one or more wire mounts, one or more mounts that are a combination of a rigid and a wire mount, or using any combination of these mounts, simultaneously or interchangeably. It is preferred that most of the parts used in all three of these mounting systems are metal, preferably, steel or stainless steel.

Any of these three mount systems can be used to install inventive images as close as desired to a structure (such as a wall or ceiling), or as distanced from it as desired (e.g., leaving space, air, and light in between, as desired). Further, this proximity may be permanently freely adjustable in any of these three mounting systems without any compromise or sacrifice to any preference in the inventive image, (e.g., without sacrificing the image's strength or permanence), and without reworking the image. For example, a with rigid mount system, a wire mount system or with a combination of these, the display of a single, inventive image can have areas mounted flushly against the wall, and other areas mounted away from the wall (e.g., in inventive images that have one or more changes of level on their backsides, or in inventive images mounted with their backsides angled in relation to the wall). Any of the mounts from these three mount systems can have any number of attachments to one or more parts of an inventive image, as desired (whether they are polymeric or non-polymeric parts of an inventive image). In general, for stability in mounting inventive images from vertical structures like walls with any of these mounting systems, one mount going from an inventive image to its vertical supporting structure can be undesirably risky for most inventive images. In general, an inventive image on two mounts may rock undesirably. Thus, on vertical structures, it is generally preferable to use three or more mounts (from any or from multiple mount systems), going from the inventive image to the structure from which it is mounted. Each mount system is comprised of one or more mounts and each of these parts is comprised of three components referred to herein as Mount Component (A), (B), and (C).

In an embodiment, rigid mounts are made, and one or more of them are used to set-up, present, install, display, exhibit or to prepare inventive images for viewing in a combination of these ways. For example, in one design for rigid mounts, most of the rigid mount components function against the pull of gravity, holding up weight. Rigid mounts can be used in a mount system that is completely comprised of rigid mounts, or in a mount system that is comprised of rigid mounts and one or more other kinds of mounts. In an embodiment, wire mounts are made, and one or more of them are used to set-up, present, install, display, exhibit or to prepare inventive images for viewing in a combination of these ways. For example, in one design for wire mounts, most of the wire mount components function along with the pull of gravity, i.e., weight hangs from them. Wire mounts can be used in a mount system that is completely comprised of wire mounts, or in a mount system that is comprised of wire mounts and one or more other kinds of mounts. In an embodiment, mounts are made that are a combination of the aforementioned rigid and wire mounts, and one or more of them are used to set-up, present, install, display, exhibit or to prepare inventive images for viewing in a combination of these ways. These combination mounts can be used in a mount system that is completely comprised of such combination mounts, or in a mount system that is comprised of such combination mounts and one or more other kinds of mounts.

Mount Component (A) is the anchoring mount component that is embedded or inlaid in, attached to, or placed against the inventive image. Because carving a cavity into an inventive image to embed or inlay its anchoring mount component may substantially weaken both the inventive image and its connection to its mount (e.g., possibly cutting through an inventive image's fiber layer exactly where more strength is needed), it is often preferable to thicken the inventive image (e.g., by adding fiber) where mount components are embedded, inlaid, attached, or placed. It may be preferable to form the appropriate image area or areas with their anchoring mount component or components in them. In thickening areas on the backside or underside of an inventive image to embed a mount component, or for any other purpose, the diffraction of light caused by abrupt edges of these thickened areas may be visible as shadow lines seen through the inventive image. By tapering these edges or any other similar image areas so that they slope gradually, such visible, shadow lines can be eliminated. When these mount components are connected to polymer, a stronger polymer than that used for the rest of the inventive image may be preferable in the mounting area or areas, even for example, if the use of such a monomer compromises other preferences for that inventive image. Because it is preferable that they remain permanently within the inventive image, it is preferable for embedded mount components to be made of strong permanent materials (e.g., stainless steel rather than steel), and installed fairly flush with the inventive image's surface. Like all embedding and inlays in inventive images, anchoring mount components can be reworked, removed or replaced if desired. Further it is preferable to be aware that all mount components made of materials that do not absorb knocks or shocks (like metal mount components protruding significantly out of the inventive image) are risks, because if knocked, polymer may be at risk for cracking or breaking.

These anchoring mount components are made of two pieces joined. One piece anchors the inventive image onto its mount. This first piece is preferably designed with as wide an expanse and as deep a grip as the inventive image can aesthetically handle. Like all materials embedded, inlaid and attached polymer, if these pieces are significant in size they should either have close to the same coefficient of expansion as their polymer host, or it is preferable to take measures to lessen differences in coefficients of expansion that put the image at risk, e.g., by perforating the anchoring mount component, etc. (Refer to the prior description of this subject herein.) If desired, for extra strength, permanence or both, further measures can be taken, e.g., fiber can be installed on the inventive image through the perforations of most embedded, inlaid or attached mount components (for example, as cut strips or chopped). The other piece of anchoring mount components is welded, silver soldered, mechanically secured, or otherwise a part of, or joined to its first piece. When embedded in the inventive image, only this part of the anchor mount component remains permanently exposed—it is in effect inlaid rather than embedded. It is half of a mating set of hardware connecting the inventive image to the other two components of the same mount (e.g., it might be a hex nut, or an eye loop). If the anchoring mount component attaches to the inventive image on an area that is metal, only its second half, the exposed, half of the mating set of hardware is necessary. Its anchoring part can be eliminated.

Mount Component (B) is the adjustable, middle mount component and may have a rigid form or a wire form. The basic, minimal design of the rigid form is shaped like the letter "O" and variable in length, width and depth, but preferably rectangular, with squared corners. For example, "O" mounts might be made of three-quarter inch steel channel for strength. At the top of the "O" mount, is a part that connects with mating hardware on the inventive image's anchoring mount component. The forms of these two mating parts are determined individually for each inventive image mount, typically according to function and aesthetics. For example, a threaded rod of any length through the top of the "O" mount can connect it to a mating, exposed hex nut on the anchoring mount component. The threaded rod can protrude out of the "O" mount at any length. If the hole at the top of the "O" mount that it passes through is wider than the threaded rod, the rod can be positioned at any angle. The threaded rod can even remain adjustable if it is tightened in position with respect to the "O" mount by hex nuts. The use of shock absorbent washers under these hex nuts (e.g., made of vinyl) are preferable to protect the polymer inventive image from cracking. Another example is a combination of Rigid and Wire Mounts. It is made of the same, rigid "O" mount, with a taught wire of any length attached as desired, instead of the threaded rod. This wire could, for example, join to an eye hook, a loop or other connector exposed on the inventive image's anchoring mount component. A hook, a metal loop, or other solution might be substituted for the wire. Many other modifications are possible, especially changes of the "O" mount's shape for aesthetic purposes.

The adjustable, middle mount component's alternate rigid form uses gravity. It is made of a male and a female part. One of these mating parts securely attaches to the inventive image (but is removable from its anchoring mount component for safe handling). The other mating part is below the inventive image, attached to the third mount component (C), that is on the support from which the inventive image is mounted, e.g., resting on the floor, a table, a base or on another stable, gravity bound support. The male part is shaped like a stick, but it might be a cylindrical rod, a rectilinear rod or any other variation rod. It is fitted to go inside the female part that is shaped like a tube, e.g., a cylindrical or rectilinear tube, etc. For example, if these mating parts are cylindrical, and only one mount is used, the inventive image can rotate. A lubricant between these two parts, such as a grease, to facilitate rotation and any means of initiating or perpetuating the inventive image's movement on this rigid mount component can be used, e.g., a motor, a human hand, wind power, etc. This mount component can give an inventive image new dimensions by giving it the formal element of movement. The inventive image's movement may change its light, another formal element. This rigid form of the adjustable middle mount component might actually be made of the same polymer as the inventive image, of another polymer that is stronger, of one or more non polymeric ingredients, or of a combination of these, as desired. This mount component might attach to a metal area on the inventive image, or if it is for one or more other metal parts of inventive images, this mount component can be welded or soldered onto them.

The adjustable, middle mount component's wire form is a wire, cord, rope, chain or even plastic wire (e.g., clear fishing line), that is able to hold the weight of the inventive image up by connecting to both the anchoring mount component in or on the inventive image, and connecting to the structure from which the inventive image is mounted. The use of stranded, stainless steel wire is often preferred so that should a strand break, others hold the inventive image up. For example, metal wire can be looped through the connector piece of the image's anchoring mount component and firmly crimped to itself with crimps (e.g., copper or steel), and using crimping pliers (such as those commonly used by telephone companies). It is preferable to crimp firmly and to insure against the failure of a crimp, it is preferable to use more than one. If a plastic wire (like clear fishing line) is used, it can be secured by tying or gluing as desired. The selection and quantity of wires, and the method and places of their attachment to the inventive image typically depends on aesthetics and on other individual inventive image specifications, which in inventive images, are largely controlled by variables that typically still remain workable as desired. The use of wire that has the capacity to hold more weight than necessary is preferred. When more than one wire is used, their weight capacity is cumulative. All wires may be doubled, tripled, etc.

It is often necessary to change the image's center of balance (e.g., when hanging an inventive image from a single wire, or when hanging them at a specific angle). Due to the typically everlasting workability of inventive images, their center of balance can typically be altered as desired, typically easily, e.g., by sanding or cutting. These changes are increasingly effective the farther they are away from the inventive image's center of balance.

A variation of this form of the wire middle mount component is to run the wire through the inventive image and secure it on the inventive image's reverse side as desired, e.g., by crimping. The wire can be terminated after it is crimped, or it can continue on to other destinations (e.g., to other compositional elements) as desired. The wire can be crimped to an embedded, anchoring mount component or it can be crimped under a mount component that is embedded, inlaid, or placed against the inventive image, between it and its crimps, or combinations of these, as desired. Although the wire can be terminated on the other side of the inventive image using crimps, without an anchoring mount component, this method is generally not preferable, especially for heavy inventive images, for inventive images hung from a single wire, or for other similar inventive images because the anchoring mount component spreads the inventive image's weight out so that it is held over a larger surface area, rather than just by the tiny spot of the crimp(s).

For instance, in one method, to install a wire through an inventive image, make a hole through it, preferably through a place that is strong and thick, or a place that has been made strong and thick for this purpose (e.g., by drilling). A straight hole, slightly wider than the diameter of the wire is usually best. Once through the inventive image, (polymer or non-polymeric materials, media, objects, devices, processes, interactions, or combinations of these), the wire should be crimped firmly. Tubing, steel or stainless steel, may be inserted over the wire as it passes through the inventive image to protect it as desired. If the tubing is long, it can constrict the inventive image's uncontrolled, wobbling movement, e.g., when hanging an inventive image from the ceiling with a single wire—the longer the tubing, the more constricted the inventive image's movement. If desired, special visual effects of weightlessness can be created using this mount variation, especially if only a single wire is used to hang the inventive image from above, and if the wire is so thin or so clear that it is imperceptible or nearly so. The visual effect of weightlessness in inventive images frequently brings the additional formal elements of movement and time into the inventive image. These formal elements can be freely minimized, eliminated, or accentuated to any degree, as desired. For example, wire mount components and their variations are particularly useful in creating mobiles with multiple parts.

Mount Component (C) is the mount component on the structure from which the inventive image is mounted that connects to the middle mount component to hold the inventive image as desired. It is frequently necessary for this mount component to reinforce the structure from which the inventive image is mounted, especially for heavy inventive images and for inventive images projected out from their mounting structure (e.g., an inventive image mounted four inches out from the wall requires its mount to hold an exponentially greater weight than the same image's mount must hold if it is mounted flush against the wall). Some inventive images do not need a mount component on the structure from which they are mounted, e.g., some light weight inventive images, and some inventive images that can already connect directly to the structure from which they are mounted. This mount component on the structure from which the inventive image is mounted can be made according to both its function and the aesthetic effect as desired.

When hanging an inventive image, this third mount component (C) can be any part with an eye hook, an open hook, or other means of connection, that can preferably be stably secured to the structure from which the inventive image is mounted and that at a minimum holds the weight necessary, preferably more than necessary (e.g., it might be screwed to the studs in the wall or into a ceiling joist). The length of the middle mount component made or partially made of wire (or another hanging material) may be adjusted and secured using any method, e.g., by tying, gluing, crimping, or combinations of these, as desired. Wire, for example, can be run through this mount component (C) and terminate, or it can be brought further to other destinations as desired, e.g., to one or more other compositional elements of any material. This wire's end may be secured using any method.

Although rigid "O" mounts and their variations can be screwed or bolted directly into the wall, ceiling or other support, all metal "O" mounts and their variations on for an inventive image might also be welded to a single plate (e.g., of steel) that can be screwed, bolted or otherwise securely connected to the structure from which the inventive image is mounted (e.g., into studs in the wall, or joists in the ceiling), often, for precise alignment, for inventive images with more than one mount attachment, or for convenience. In attaching to the wall or other support, this plate (which might be metal), may distribute the weight of the inventive image over a larger surface area. This plate also may fix the middle mount component(s') position in relation to the structure on which it or they are mounted so that the installation of the image is less complex and less dependent on the eye of the installer while typically still allowing middle mount components to be permanently adjustable (e.g., the length and angle of the threaded rods). A Wire Mount System can also be used off of a mounting plate either independently or in combination with Rigid Mounts (the mounting plate might be metal).

The size, thickness, and other specifications of such mounting plates are preferably determined according to individual structural and aesthetic considerations. Aesthetically, for example, such a plate can be used as a compositional design dement under the inventive image, e.g., as a layer for underpainting and underdrawing, or a reflective or light emitting layer for instance, using polymer LED(s). Often, any significant part of this mounting plate that is painted the same color as the wall and seen through an inventive image will be visually perceived as part of the wall, i.e., as if the mounting plate was not there or almost so. A thin mounting plate can often be used without being noticed. The inventive image might also be painted, incised or otherwise further developed and finished on all of its exposed sides. The aesthetic possibilities using such a plate as an underlayer are extraordinary. The aesthetic control and creative freedom afforded by its use with inventive images are unequaled in fine arts, and in many other images too. When mounting a transparent or translucent inventive image, the entire mount including this plate can be a visual part of the inventive image that the image maker may shape, texture, paint, etc. as desired according to the inventive image's structural and aesthetic needs. The plate may be cut in an irregular shape (e.g., the shape of a person's silhouette), or the plate may actually be more than one plate, all of which are secured (preferably flushly) against the wall or other supporting structure, typically depending on the structural and aesthetic needs of the inventive image. Alternately, the plate may be a three dimensional inventive image part, e.g., of metal. When this plate is used to mount a transparent inventive image, and the plate or a part thereof is painted to look the same as the supporting structure it is attached to (e.g., if it is painted white like the white wall it is bolted onto), the plate may be camouflaged and it may be effectively invisible. Thus, the image maker can have a lot of structural and aesthetic control.

For rigid middle mount components, the third mount component includes the other half of the mating pair previously described protruding upwards from it, that can be either half of the mating pair. This third mount component can take one of two forms. It can be floor bound, such as a base, a pedestal, or a table top, or it can be a vertically mounted metal plate, in which case it is sometimes preferable to make the mating parts in shapes that are not cylindrical to avoid rotation, e.g., they might be rectilinear rod with a fitted, mating tube.

The wire and rigid mount systems can be combined as desired. In one example, the "O" mount, threaded rod, hex nuts and washers in the rigid mount system are substituted by a wire or cord. One end of the wire might loop around an embedded piece in the inventive image (preferably around an embedded metal piece) and it might be knotted, crimped, glued or otherwise secured. The other end of the wire might connect to the wall or other supporting structure, or to a plate on the supporting structure (typically secured on the supporting structure, preferably flushly upon it, and preferably bolted upon it), this wire again connecting by crimping, welding, etc., e.g., onto an eye-hook on the wall or through a loop on a metal plate on the wall. Alternately, rather than connecting one end of the wire to the inventive image and the other to the supporting structure, the wire might be strung through the mount piece (typically a metal piece) embedded in the inventive image and strung through an eye-hook, metal plate or other part on the wall, then if desired, using a double crimp its two ends might be crimped together (or welded or glued together). In this example a metal piece that might be embedded in the inventive image may not need a hex nut welded to it, but preferably a loop-like part would be accessible on it for the wire to connect to. This mount will work only if the area on the inventive image that attaches to the wire mount is lower than the location of the wire mount's connection on the wall, ceiling (or other supporting structure). This example differs from the wire mount system because its wire does not go through the inventive image knotting or crimping on its other side. Its wire stays on one side of the inventive image. However its wire might continue on either end to connect to other parts. A second example of combining wire and rigid mount systems begins with the wire mount system but substitutes an "O" mount instead of the wire or cord. The rigid "O" mount goes through the inventive image, ending on its other side.

In addition, all of the inventive images described herein might, if desired, be further processed using any method(s) and material(s), such as the examples provided herein and/or in U.S. Pat. Nos. 7,629,400; 8,669,325 and 8,921,473. The inventive image specifications described herein might be further understood when used with embodiments described in U.S. Pat. Nos. 7,629,400; 8,669,325 and 8,921,473, and/or when they are applied to fitting examples, illustrations and drawings from U.S. Pat. Nos. 7,629,400; 8,669,325 and 8,921,473. For instance, specifications for the compositions of surface preparation stabilizers provided herein can be further understood by examples, illustrations and drawings (Figures) in U.S. Pat. No. 7,629,400 describing and showing surface preparation stabilizers.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method of making a two or three-dimensional image-making support medium that is for the creation and display of a two or three-dimensional work of art, design that is applied art, and/or architecture, and the method comprises:
   making the work so that it is macroscopic and
   so that it is a whole in and of itself with distinct edges or boundaries, preparing the work with one or more devices that are: capable of emitting light, non-light-emissive and capable of change or of being changed, or a combination of these, and (A) making the work with at least one light-emitter that is one or a combination of: an organic light-emitting diode (OLED); a light-emitting display that is partially or entirely transparent or translucent; a light-emitting display capable of flexing or folding; a light-emitting display that is approximately about 6 mm thick or thinner; or a light emitting device that has at least one nanomaterial; and/or (B) making the work with at least one electronic paper display or e-material, and in addition making the work as a two or three-dimensional artwork, picture or work of design that is applied art other than lighting design, an architectural structure or architecture and that is other than a conventional computer, camera, phone, personal digital assistant device, portable media player device or a utilitarian wrist watch.

2. A method of making a two or three-dimensional image-making support medium that is for the creation and display of a two or three-dimensional work of art, design that is applied art, and/or architecture, and the method comprises:

making the work so that it is macroscopic and so that it is a whole in and of itself with distinct edges or boundaries, preparing the work with two or more devices that are capable of emitting light, so that it has at least one light-emitter that is one or a combination of: an organic light-emitting diode (OLED); a light-emitting display that is partially or entirely transparent or translucent; a light-emitting display capable of flexing or folding; a light-emitting display that is approximately about 6 mm thick or thinner; or a light emitting device that has at least one nanomaterial; and also making the work as a two or three-dimensional artwork, picture, or work of design that is applied art, an architectural structure or architecture and that is other than a conventional computer, camera, phone, personal digital assistant device, portable media player device, or a utilitarian wrist watch.

3. The method of claim 2 in which the two or three-dimensional image support medium, artwork, picture, work of design, architectural structure or work of architecture is made with two or more parts that can be prepared in a compositional arrangement that are either capable of being rearranged into a different compositional arrangement at least once, or that are rearranged into a different compositional arrangement at least once.

4. The method of claim 2 in which the two or three-dimensional image support medium, artwork, picture, work of design, architectural structure or work of architecture has: (a) open space or negative space within part or all of its form, (b) open or negative space between two or more of its parts; and/or (c) open space or negative space within part or all of its compositional arrangement.

5. The method of claim 2 in which the image support medium or the finished or unfinished aesthetic work has a means of display, presentation, mounting or installation that leaves space between the work or a significant visible portion of it and the wall, ceiling, floor or other structure from or on which it is displayed, presented, mounted or installed.

6. The method of claim 2 in which the image support medium or the finished or unfinished aesthetic work has one or more OLEDs, it has one or more LEDs, or it has both.

7. The method of claim 2 in which the image support medium or the finished or unfinished aesthetic work has at least one light-emitting display screen that is approximately about 6 mm thick or thinner.

8. The method of claim 2 in which the image support medium or the finished or unfinished aesthetic work has one or more light-emitting devices made with one or more nanomaterials.

9. The method of claim 2 in which the image support medium or the finished or unfinished aesthetic work is lighting design, and/or a light fixture.

10. The method of claim 2 in which the image making support medium or the finished or unfinished aesthetic work is made to have or connect to electricity or energy.

11. The method of claim 2 in which the image support medium or the finished or unfinished aesthetic work has at least one light-emitter or light-emitting part that is flexed or folded or that is capable of flexing or folding, the work has at least one LED, OLED or other light-emitter that is flexed, folded, transparent, translucent and/or capable of flexing or folding; or the work has a combination of these.

12. The method of claim 2 in which the image support medium or the finished or unfinished aesthetic work is prepared with a means of display, presentation, mounting or installation that enables it or part of it to roll, unroll, scroll, fold and/or unfold.

13. The method of claim 2 in which the image support medium or the finished or unfinished aesthetic work is capable of being installed, mounted, hung or displayed on or connected to a vertical support or a wall; the work has a means of hanging; the work has a means of mounting, installation or display on or connected to a vertical support or a wall; the work has at least one part enabling any of these means of installation, mounting, hanging or display; the work is a mural; or a combination of these.

14. The method of claim 2 in which the image support medium or the finished or unfinished aesthetic work is capable of being installed, mounted, hung or displayed from above, from the ceiling, on a structure above and/or on the ceiling; or the work has a means or at least one part enabling it to be installed, mounted, hung or displayed in at least one of these ways; or the work is wearable, it is clothing, it is jewelry, it is a bracelet, it is a necklace, it is a tote, a handbag, or a combination of these.

15. The method of claim 2 in which the two or three-dimensional image support medium, artwork, picture, work of design, architectural structure or work of architecture shows the signature or distinguishing mark identifying the artist, designer or group of artists and/or designers who created it.

16. The method of claim 2 in which image support medium or the finished or unfinished aesthetic work is capable of changing over time, it is capable of interactivity, it is capable of responding to a stimulant, influence or trigger, or a combination of these.

17. The method of claim 2 in which image support medium or the finished or unfinished aesthetic work is programmed, can be programmed or both.

18. The method of claim 2 in which the aesthetic work has a minimal or minimalistic style or aesthetic, and/or it has a modernist style or aesthetic.

19. The method of claim 2 in which the image support medium or the finished or unfinished aesthetic work has one or more of these specifications:
  (a) it is an abstract work; it has an abstraction, and/or it has an abstraction of: light, nature, a part of nature, a plant, a human or an animal; it is made with a design that is largely or entirely geometric; at least one of its devices or displays is curved or undulating; or the aesthetic work shows: a figure, an animal, a still life, landscape, nature, the sky, a part or aspect of any of these, subject matter that is not physically present, drawing, painting, a pattern, a depiction or representation of a recognizable subject; a visual effect or design resembling that in a well-known work of art or design or resembling that by a well-known artist or designer; an overall aesthetic shape or form that is figurative or that depicts or represents a recognizable subject; a pictorial or design element; one or more of these that changes or that can be changed over time; or a combination of these;
  (b) the work has a rigid mount system, a wire mount system, or a combination rigid and wire mount system;
  (c) the work has at least one transparent or translucent form or display that is capable of aesthetic change;
  (d) the work is a window or part of a window, it is furniture or it is unfinished;
  (e) the work has two or more layers that are at least partially superimposed;
  (f) the image making support medium or the finished or unfinished aesthetic work is accompanied by instructions for developing it, instructions for modifying or changing it, and/or instructions for displaying it;
  (g) the image making support medium or the finished or unfinished aesthetic work is made by one image-maker or by one group of image-makers, and transferred to one or more different image makers and/or viewers who further develop it, display it or both;
  (h) the image support medium or the aesthetic work has most or all of its utilitarian elements are hidden from view and/or entirely or predominantly unobvious or unapparent to viewers looking at it as a whole, or most or all of its utilitarian elements are integrated in this way when the work is inactive;
  (i) the work has a title as art or as a work of design or architecture;
  (j) the work is other than a conventional computer, camera, phone, personal digital assistant device, portable media player device, a utilitarian wrist watch or a conventional window that changes uniformly to serve purely utilitarian purposes;
  (k) the aesthetic work is free from any separate alternative functionality or purpose that differs from that described in claim 2;
  (l) the aesthetic work is free of being purely commercial or informational;
  (m) the aesthetic work is lighting design, a light fixture and/or capable of functioning as lighting;
  (n) the work has a visible signature or distinguishing mark identifying the artist, designer or group of artists and/or designers who created it which is other than the mark of an industrial or commercial manufacturer or scientific organization;
  (o) the aesthetic work is a whole in and of itself that is other than a system of communicating art instruction providing recorded audio and video instruction in a plurality of steps to enable a student viewing it and listening to it to make a separate artwork;
  (p) the aesthetic work has glass, polymer and/or metal; or
  (q) a combination of these.

20. The method of claim 1 in which the aesthetic work is prepared with at least one electronic paper display or e-material as a work of: fine art; architecture; clothing design, fashion design, a work of design that is a clothing or fashion accessory, hat design or belt design; a work of design that functions as a tote bag, a handbag, or a container; costume design; jewelry design, or jewelry design that is a necklace, a bracelet, an anklet, a ring, a pin or earrings; or a work of design that is applied art for viewing or display apart from being worn directly upon the human body as jewelry design, clothing design or watch design.

21. The method of claim 1 in which the finished or unfinished aesthetic work is a lighting design and/or a light fixture.

22. A method of making a macroscopic, two or three-dimensional image-making support medium that is for the creation and display of a two or three-dimensional work of art, design that is applied art, and/or architecture, and the method comprises:
  making the work so that it is macroscopic and also so that it is a whole in and of itself with distinct edges or boundaries,
  making the work with at least one light-emitter that is one or a combination of an organic light-emitting diode (OLED); a light-emitting display that is partially or entirely transparent or translucent; a light-emitting display capable of flexing or folding; a light-emitting display that is approximately about 6 mm thick or thinner; an organic light-emitting transistor (OLET), or a light emitting device that has at least one nanomaterial; and,
  making the work with a means of display, presentation, mounting or installation; and also
  making this work as a two or three-dimensional artwork, picture, work of design that is applied art, architectural structure or work of architecture and that is other than a conventional computer, camera, phone, personal digital assistant device, portable media player device or a utilitarian wrist watch.

23. The method of claim 22 in which the image support medium or the finished or unfinished aesthetic work is prepared with a means of display, presentation, mounting or installation that:
  (1) holds, supports or is physically attached to one or more of it's light emitters;
  (2) leaves space between it or a significant visible portion of it and the wall, ceiling, floor or other structure from or on which it is displayed, presented, mounted or installed;
  (3) is a rigid mount system, a wire mount system, or a combination rigid and wire mount system;
  (4) is a means or a rigid means that facilitates, holds or supports at least part of the work that flexes, is flexed, rolls, is rolled, folds or is folded: or
  (5) is a combination of these.

24. A method of making a two or three-dimensional image-making support medium that is for the creation and display of a two or three-dimensional work of design that is applied art and lighting design, and the method comprises:
  making the work so that it is macroscopic and so that it is a whole in and of itself with distinct edges or boundaries,
  preparing the work with an organic light-emitting diode (OLED); a light-emitting display that is partially or entirely transparent or translucent; a light-emitting display capable of flexing or folding; a light-emitting display that is approximately about 6 mm thick or thinner; or a light emitting device that has at least one nanomaterial;

preparing the work to have or connect to electricity or energy, and making the work as a two or three-dimensional or work of design that is applied art and lighting design.

25. A method of making a two or three dimensional image-making support medium for the creation and display of a work of two or three-dimensional macroscopic design that is applied art, and the method comprises:

making the work so that it is macroscopic and so that it is a whole in and of itself with distinct edges or boundaries, making the work with at least one visible surface that is transparent, translucent or both to allow light to pass into it or through it, and making the work with at least one transparent and/or translucent polymer or polymer composition that is partially or entirely: poly (methyl methacrylate), acrylic, or partially or entirely made with a methacrylate ester or a methacrylamide derivative, and the work also has one or more of (A)-(C):

(A) the at least one polymer or the polymer composition is: (i) partially but not completely made with: poly (methyl methacrylate), acrylic, methacrylate ester or a methacrylamide derivative; (ii) partially or entirely paper thin or with substantially no perceivable depth; or (iii) partially or entirely flexible;

(B) the work has at least one stabilizer to maintain, enhance or enable scratch resistance, abrasion resistance, mar resistance, hardness or impact resistance; or (C) the at least one polymer or polymer composition is made stiffer and/or stronger with a different polymer; and in addition, making the work as a two or three-dimensional work of design that is applied art, with the at least one transparent and/or translucent polymer or polymer composition being in addition to or beneath any thin clear protective coating the work might also have.

26. A method of making a two or three dimensional image-making support medium for the creation and display of two or three-dimensional macroscopic art, design that is applied art and/or architecture, and the method comprises:

making the work so that it is macroscopic, and so that it is a whole in and of itself with distinct edges or boundaries, making the work with at least one synthetic polymer or polymer composition that is transparent and/or translucent, and that is other than acrylic, poly (methyl methacrylate), or polymer made with a methacrylate ester or methacrylamide derivative, so that the work has at least one visible surface that is transparent and/or translucent to allow light to pass into it or through it; and the work also has a stabilizer present to enhance the ability of the formed polymer, the polymer composition and/or the work to remain color stable or to remain unchanged with exposure to ultraviolet light, and making the work with the at least one polymer or the polymer composition partially or entirely inflexible; and also making the work as a two or three-dimensional artwork, picture, work of design that is applied art, architectural structure or work of architecture, with the at least one transparent and/or translucent polymer or polymer composition being in addition to or beneath any thin clear protective coating the work might also have.

27. A method of making a two or three dimensional image-making support medium for the creation and display of two or three-dimensional macroscopic art, design that is applied art and/or architecture, and the method comprises:

making the work so that it is macroscopic, and so that it is a whole in and of itself with distinct edges or boundaries;

making the work with at least one synthetic polymer that is transparent, translucent, absorbent and/or conductive, and according to one or more of (A)-(C):

(A) making the work with: a surface preparation stabilizer or a stabilizer to enhance or enable bonding or facilitate superimposing applications; or a stabilizer to affect surface flow or leveling;

(B) making the work with a strengthening stabilizer that is internal or on it, and with one or more of (i)-(ii):

(i) a stabilizer to provide or enhance color stability or the ability to remain unchanged with exposure to ultraviolet light;

(ii) a surfacing veil fiberglass or a fiber that becomes significantly invisible or invisible to the unaided human eye when it is within or under transparent colorless polymer, and/or when within or under transparent colorless polymer that is at least about a quarter inch thick;

(C) the at last one polymer is a conductive polymer that is separate front any photographic recording material or photographic print the work might also have; the at least one polymer is a synthetic absorbent polymer; or the work has one or more nanomaterials, and also making the work with one or more of (A)-(C) above, as a two or three-dimensional artwork, picture, work of design that is applied art, architectural structure or work of architecture.

28. The method of claim 25 in which the aesthetic work is a work of design that is applied art that functions as as a partition, as a screen, as a case or container, as a household object, as a bowl, a vase, a tray, a plate, a dish, a menorah, or as a cup or goblet.

29. The method of claim 27 in which the image support medium or the finished or unfinished aesthetic work is made so that at least part of it functions as a lens, it is made with three or more lenses, it is made with a dichroic or a reflective effect, or it is made with one or more prisms.

30. The method of claim 27 in which the image support medium or the finished or unfinished aesthetic work is made with a stabilizer to enhance its strength, stability and/or its permanence.

31. A method of making a two or three dimensional image-making support medium for the creation and display of two or three-dimensional macroscopic art and/or architecture, and the method comprises:

making the work so that it is macroscopic and so that it is a whole in and of itself with distinct edges or boundaries, making the work with at least one visible surface that is transparent, translucent or both to allow light to pass into it or through it, and making the work with at least one transparent and/or translucent polymer or polymer composition that is partially or entirely: poly (methyl methacrylate), acrylic, or partially or entirely made with a methacrylate ester or a methacrylamide derivative, and the work also has one or more of (A)-(C):

(A) the at least one polymer or the polymer composition is: (i) partially but not completely made with: poly (methyl methacrylate), acrylic, methacrylate ester or a methacrylamide derivative; (ii) partially or entirely paper thin or with substantially no perceivable depth; or (iii) partially or entirely flexible;

(B) the work has at least one stabilizer to maintain, enhance or enable scratch resistance, abrasion resistance, mar resistance, hardness or impact resistance; or (C) the at least one polymer or polymer composition is made stiffer and/or stronger with a different polymer; and in addition, making the work as a two or three-dimensional artwork, picture, architectural structure or work of architecture, with the at least one transparent and/or translucent polymer or polymer composition being in addition to or beneath any thin clear protective coating the work might also have.

32. A method of making a two or three dimensional image-making support medium for the creation and display of two or three-dimensional macroscopic design that is applied art and the method comprises:

making the work so that it is macroscopic, and so that it is a whole in and of itself with distinct edges or boundaries, making the work with at least one synthetic polymer or polymer composition that is transparent and/or translucent, that either is polycarbonate or that has polycarbonate, and making the work so that it has at least one visible surface that is transparent and/or translucent to allow light to pass into it or through it; and the work also has a stabilizer present that is a stabilizer to enhance the ability of the formed polymer, the polymer composition and/or the work to remain color stable or to remain unchanged with exposure to ultraviolet light, or that is a stabilizer to enhance scratch resistance, abrasion resistance or mar resistance, and also making the work as a two or three-dimensional work of design that is applied art with the at least one transparent and/or translucent polymer or polymer composition being in addition to or beneath any thin clear protective coating the work might also have.

33. A method of making a two or three dimensional image-making support medium for the creation and display of two or three-dimensional macroscopic art and/or architecture, and the method comprises:

making the work so that it is macroscopic, and so that it is a whole in and of itself with distinct edges or boundaries, making the work with at least one synthetic polymer or polymer composition that is transparent and/or translucent, that either is polycarbonate or that has polycarbonate, and making the work so that it has at least one visible surface that is transparent and/or translucent to allow light to pass into it or through it; and the work also has a stabilizer present that is a stabilizer to enhance the ability of the formed polymer, the polymer composition and/or the work to remain color stable or to remain unchanged with exposure to ultraviolet light, or that is a stabilizer to enhance scratch resistance, abrasion resistance or mar resistance, and also making the work as a two or three-dimensional artwork, picture, architectural structure or work of architecture, with the at least one transparent and/or translucent polymer or polymer composition being in addition to or beneath any thin clear protective coating the work might also have.

34. A method of making a two or three dimensional image-making support medium that is for the creation and display of two or three-dimensional macroscopic art, design that is applied art and/or architecture, and the method comprises:

making the work so that it is macroscopic, and so that it is a whole in and of itself with distinct edges or boundaries, making the work with at least one synthetic polymer or polymer composition that is transparent and/or translucent, that either is polyester or that has polyester, and making the work so that it has at least one visible surface that is transparent and/or translucent to allow light to pass into it or through it; and the work also has a stabilizer present that is a stabilizer to enhance the ability of the formed polymer, the polymer composition and/or the work to remain color stable or to remain unchanged with exposure to ultraviolet light, and also making the work as a two or three-dimensional artwork, picture, work of design that is applied art, architectural structure or work of architecture, with the at least one transparent and/or translucent polymer or polymer composition being in addition to or beneath any thin clear protective coating the work might also have.

35. A method of making a two or three dimensional image-making support medium that is for the creation and display of two or three-dimensional macroscopic art, design that is applied art and/or architecture, and the method comprises:

making the work so that it is macroscopic, and so that it is a whole in and of itself with distinct edges or boundaries, making the work with at least one synthetic polymer or polymer composition that is transparent and/or translucent, and that is other than acrylic, poly (methyl methacrylate), or polymer made with a methacrylate ester or methacrylamide derivative, so that the work has at least one visible surface that is transparent and/or translucent to allow light to pass into it or through it; and the work also has a stabilizer present to enhance the ability of the formed polymer, the polymer composition and/or the work to remain color stable or to remain unchanged with exposure to ultraviolet light, and making the work with the at least one polymer or the polymer composition one or more of: a copolymer; a mixture of two or more polymers; superimposed by a different polymer; made with two or more polymers superimposed; made with only one monomer or only one polymer that is other than polyvinyl chloride or cellulose acetate, and also making the work as a two or three-dimensional artwork, picture, work of design that is applied art, architectural structure or work of architecture, with the at least one transparent and/or translucent polymer or polymer composition being in addition to or beneath any thin clear protective coating the work might also have.

36. The method of claim 1 in which the aesthetic work is prepared with at least one electronic paper display or e-material and it functions as: furniture or as a table, it is a mural or it is a work of fine art or a work of design that is applied art for viewing or display on or in a wall or architectural structure.

37. The method of claim 25 in which the at least one polymer or the polymer composition is partially but not completely made with: poly(methyl methacrylate), acrylic, methacrylate ester or a methacrylamide derivative.

38. The method of claim 25 in which the aesthetic work has at least one stabilizer to maintain, enhance or enable scratch resistance, abrasion resistance, mar resistance, hardness or impact resistance.

39. The method of claim 25 in which the at least one polymer or polymer composition is made stiffer and/or stronger with a different polymer.

40. The method of claim 25 in which the aesthetic work is a work of design that is applied art that functions as furniture, a chair, a table, a chest, a cabinet, a cart, a bench or as lighting or a light fixture.

41. The method of claim 25 in which the aesthetic work is transparent and part or all of it may have color or the entire work may be colorless.

42. The method of claim 32 in which the aesthetic work has a stabilizer to enhance the ability of the formed polymer, the polymer composition and/or the work to remain color stable or to remain unchanged with exposure to ultraviolet light.

43. The method of claim 32 in which the aesthetic work has at least one stabilizer to enhance scratch resistance, abrasion resistance or mar resistance.

44. The method of claim 32 in which the aesthetic work is a work of design that is applied art that functions as furniture, a chair, a table, a chest, a cabinet, a cart, a bench or as lighting or a light fixture.

45. The method of claim 32 in which the aesthetic work is transparent and part or all of it may have color or the entire work may be colorless.

* * * * *